(12) United States Patent
Piao

(10) Patent No.: US 11,057,629 B2
(45) Date of Patent: Jul. 6, 2021

(54) ENCODING METHOD AND APPARATUS THEREFOR, DECODING METHOD AND APPARATUS THEREFOR

(71) Applicant: SAMSUNG ELECTRONICS CO., LTD., Suwon-si (KR)

(72) Inventor: Yin-Ji Piao, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/618,892

(22) PCT Filed: Jul. 17, 2018

(86) PCT No.: PCT/KR2018/008065
§ 371 (c)(1),
(2) Date: Dec. 3, 2019

(87) PCT Pub. No.: WO2019/017673
PCT Pub. Date: Jan. 24, 2019

(65) Prior Publication Data
US 2020/0169738 A1    May 28, 2020

Related U.S. Application Data

(60) Provisional application No. 62/534,424, filed on Jul. 19, 2017.

(51) Int. Cl.
*H04N 19/176* (2014.01)
*H04N 19/184* (2014.01)
*H04N 19/50* (2014.01)

(52) U.S. Cl.
CPC ......... *H04N 19/176* (2014.11); *H04N 19/184* (2014.11); *H04N 19/50* (2014.11)

(58) Field of Classification Search
CPC .... H04N 19/176; H04N 19/184; H04N 19/50; H04N 19/172; H04N 19/96; H04N 19/119; H04N 19/129
See application file for complete search history.

(56) References Cited

U.S. PATENT DOCUMENTS 8,891,889 B2    11/2014   Yu et al.
8,953,682 B2    2/2015    Chen et al.
(Continued)

FOREIGN PATENT DOCUMENTS

EP    1 956 847 A1    8/2008
JP    4927753 B2      5/2012
(Continued)

OTHER PUBLICATIONS

Communication dated Sep. 1, 2020 issued by the Korean Intellectual Property Office in Korean Application No. 10-2019-7027188.
(Continued)

*Primary Examiner* — Nam D Pham
(74) *Attorney, Agent, or Firm* — Sughrue Mion, PLLC

(57) ABSTRACT

Provided is a video decoding method including obtaining split information indicating whether a current block is to be split from a bitstream; splitting the current block into two or more sub-blocks when the split information indicates that the current block is to be split; determining lower horizontal coding order information of the sub-blocks of the current block according to higher horizontal coding order information applied to the current block, based on at least one of split information, size information, and neighboring block information of the current block; and decoding the sub-blocks according to the lower horizontal coding order information.

6 Claims, 24 Drawing Sheets

(56) References Cited

U.S. PATENT DOCUMENTS

| | | | |
|---|---|---|---|
| 9,420,293 | B2 | 8/2016 | Song et al. |
| 9,432,687 | B2 | 8/2016 | Cho et al. |
| 10,375,401 | B2 | 8/2019 | Palfner et al. |
| 2013/0064292 | A1 | 3/2013 | Song et al. |
| 2013/0287116 | A1 | 10/2013 | Helle et al. |
| 2014/0185671 | A1 | 7/2014 | Lee et al. |
| 2015/0010048 | A1 | 1/2015 | Puri et al. |
| 2017/0201750 | A1 | 7/2017 | Komiya et al. |
| 2017/0272750 | A1* | 9/2017 | An .............. H04N 19/147 |
| 2017/0353721 | A1 | 12/2017 | Piao et al. |
| 2018/0324434 | A1 | 11/2018 | Piao |

FOREIGN PATENT DOCUMENTS

| | | |
|---|---|---|
| KR | 10-2017-0136411 A | 7/2001 |
| KR | 10-2009-0075335 A | 7/2009 |
| KR | 10-2013-0031078 A | 3/2013 |
| KR | 10-1379188 B1 | 4/2014 |
| KR | 10-2014-0057188 A | 5/2014 |
| KR | 10-2014-0088002 A | 7/2014 |
| KR | 10-1427229 B1 | 8/2014 |
| KR | 10-1487686 B1 | 1/2015 |
| KR | 10-2015-0051976 A | 5/2015 |
| WO | 91/13514 A1 | 9/1991 |
| WO | 2017/090967 A1 | 6/2017 |
| WO | 2017/209394 A1 | 12/2017 |

OTHER PUBLICATIONS

International Search Report (PCT/ISA/210) and Written Opinion (PCT/ISA/237) dated Oct. 15, 2018 issued by the International Searching Authority in International Application PCT/KR2018/008065.

International Search Report (PCT/ISA/210) and Written Opinion (PCT/ISA/237) dated Jul. 18, 2017 issued by the International Searching Authority in International Application PCT/KR2017/004170.

Taichiro Shiodera et al., "Block Based Extra/Inter-Polating Prediction for Intra Coding", Image Processing, ICIP 2007, IEEE, XP031158358, Sep. 1, 2007, 4 pages.

Ken McCann et al., "Video coding technology proposal by Samsung (and BBC)", Joint Collaborative Team on Video Coding (JCT-VC) of ITU-T SG16 WP3 and ISO/IEC JTC1/SC29/WG11, JCTVC-A124, XP030007573, Jun. 1, 2010, pp. 1-42.

Jaeil Kim et al., "Enlarging MB size for high fidelity video coding beyond HD", 36th VCEG Meeting, Video Coding Experts Group of ITU-T SG.16, VCEG-AJ21, XP030003643, Oct. 5, 2008, pp. 1-6.

Xiang Li et al., "Multi-Type-Tree", Joint Video Exploration Team (JVET) of ITU-T SG 16 WP 3 and ISO/IEC JTC 1/SC 29/WG11, 4th Meeting, Chengdu, CN, JVET-D0117r1, XP030150367, Oct. 20, 2016, pp. 1-3.

Communication dated Apr. 25, 2019 issued by the European Patent Office in counterpart European Application No. 17806887.0.

Communication dated Sep. 23, 2019 issued by the European Patent Office in counterpart European Application No. 17806887.0.

"High efficiency video coding", Series H: Audiovisual and Multimedia Systems, Infrastructure of audiovisual services—Coding of moving video, Telecommunication Standardization Sector of ITU, H.265, Apr. 13, 2013, 317 pages.

Communication dated Mar. 18, 2021, issued by the European Patent Office in counterpart European Application No. 17806887.0.

Guo et al., "Hierarchical Quadtree-Based Flexible Block Ordering in HEVC Intra Coding," Visual Communications and Image Processing (VCIP) 2016, Nov. 2016, Total 4 pages, XP055784296.

\* cited by examiner

FIG. 12

| BLOCK SHAPE / DEPTH | 0: SQUARE | 1: NS_VER | 2: NS_HOR |
|---|---|---|---|
| DEPTH D | 1200 | 1210 | 1220 |
| DEPTH D+1 | 1202 | 1212 | 1222 |
| DEPTH D+2 | 1204 | 1214 | 1224 |
| ... | ... | ... | ... |

ENCODING METHOD AND APPARATUS THEREFOR, DECODING METHOD AND APPARATUS THEREFOR

TECHNICAL FIELD

The present disclosure relates to a video encoding method and a video decoding method, and more particularly, to an intra or inter prediction method for a method and apparatus for determining an encoding/decoding order of an image.

BACKGROUND ART

A large amount of data is required to encode high-quality video. However, a bandwidth allowed for transmission of video data is limited and thus a data rate to be applied for transmission of video data may be limited. Thus, for efficient transmission of video data, there is a need for a method of encoding and decoding video data at a higher compression ratio while minimizing degradation of image quality.

Video data may be compressed by removing spatial redundancy and temporal redundancy between pixels. Generally, there are common features between adjacent pixels and thus encoding information is transmitted in a data unit composed of pixels to remove redundancy between adjacent pixels.

Pixel values of the pixels included in the data unit are not directly transmitted directly but a method necessary to obtain the pixel values is transmitted. A prediction method of predicting a pixel value close to an original value is determined for each data unit, and encoding information regarding the prediction method is transmitted from an encoder to a decoder. In addition, because the predicted value is not exactly the same as the original value, residual data regarding the difference between the original value and the predicted value is transmitted from the encoder to the decoder.

As the accuracy of prediction becomes higher, the amount of encoding information required to specify the prediction method increases but the size of the residual data decreases. Therefore, a prediction method is determined in consideration of sizes of the encoding information and the residual data. In particular, data units split from a picture have various sizes. As the sizes of the data units are larger, the accuracy of prediction is more likely to decrease but the amount of encoding information decreases. Therefore, a block size is determined according to characteristics of the picture.

Prediction methods are divided into intra prediction and inter prediction. Intra prediction is a method of predicting pixels of a block from neighboring pixels of the block. Inter prediction is a method of predicting pixels by referring to pixels of another picture referenced by a picture including a block. Therefore, spatial redundancy is removed by intra prediction and temporal redundancy is removed by inter prediction.

As the number of prediction methods increases, the amount of encoding information for representing the prediction method increases. Therefore, the encoding information applied to the block may also be predicted from another block to reduce the size of the encoding information.

Because a loss of video data is allowed provided it is not recognized by human vision, the residual data may be lossy compressed by transformation and quantization to reduce the amount of the residual data.

DESCRIPTION OF EMBODIMENTS

Technical Problem

Provided is a video encoding method of determining whether a current block is split and a coding order of sub-blocks of the current block and determining an encoding method according to whether neighboring blocks of the current block are encoded. Provided is also a video decoding method of splitting a current block, determining a coding order of sub-blocks split from the current block, and determining an encoding method according to whether neighboring blocks of the current block are encoded. Provided is also a computer-readable recording medium having recorded thereon a program for executing the video encoding method and the video decoding method according to an embodiment of the present disclosure in a computer.

Solution to Problem

According to an aspect of the present disclosure, a video decoding method includes obtaining split information indicating whether a current block is to be split from a bitstream; splitting the current block into two or more sub-blocks when the split information indicates that the current block is to be split; determining lower horizontal coding order information of the sub-blocks of the current block according to higher horizontal coding order information applied to the current block, based on at least one of split information, size information, and neighboring block information of the current block; and decoding the sub-blocks according to the lower horizontal coding order information.

According to another aspect of the present disclosure, a video decoding apparatus includes a processor configured to: obtain split information indicating whether a current block is to be split from a bitstream; split the current block into two or more sub-blocks when the split information indicates that the current block is to be split; determine lower horizontal coding order information of the sub-blocks of the current block according to higher horizontal coding order information applied to the current block, based on at least one of split information, size information, and neighboring block information of the current block; and decode the sub-blocks according to the lower horizontal coding order information.

According to another aspect of the present disclosure, a video encoding method includes determining whether a current block is split; when the current block is split, determining lower horizontal coding order information of two or more sub-blocks included in the current block according to upper horizontal coding order information applied to the current block, based on at least one of split information, size information, and neighboring block information of the current block; and encoding the sub-blocks according to the lower horizontal coding order information.

According to another aspect of the present disclosure, a video encoding apparatus comprising a processor configured to: determine whether a current block is split; when the current block is split, determine lower horizontal coding order information of two or more sub-blocks included in the current block according to upper horizontal coding order information applied to the current block, based on at least one of split information, size information, and neighboring block information of the current block; and encode the sub-blocks according to the lower horizontal coding order information.

According to another aspect of the present disclosure, there is provided a non-transitory computer-recordable recording medium storing a program for performing the video encoding method and the video decoding method.

Aspects of the present embodiment are not limited thereto and other aspects may be derived from embodiments set forth herein.

Advantageous Effects of Disclosure

A lower horizontal coding order of a current block can be determined from a higher horizontal coding order of the current block, and sub-blocks of the current block can be decoded in the lower horizontal coding order, such that coding efficiency of an image is improved.

BRIEF DESCRIPTION OF THE DRAWINGS

FIG. 12 illustrates a process of determining a depth of a coding unit as a shape and size of the coding unit change, when the coding unit is recursively split such that a plurality of coding units are determined, according to an embodiment.

BEST MODE

Figure 1A:
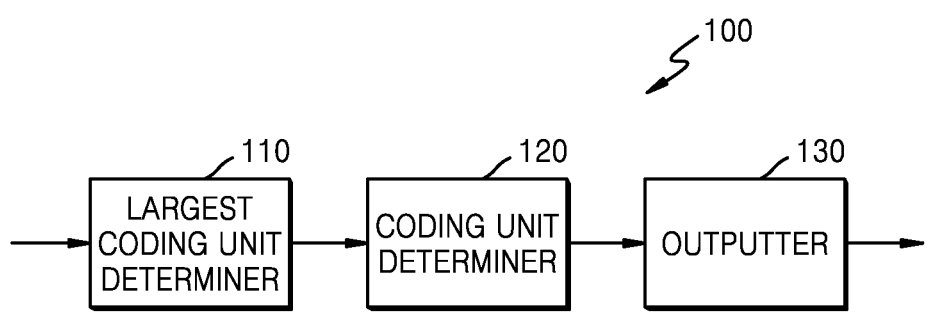
FIG. 1A is a block diagram of a video encoding apparatus based on coding units of a tree structure, according to an embodiment of the present disclosure.

Provided is a video decoding method including obtaining split information indicating whether a current block is to be split from a bitstream; splitting the current block into two or more sub-blocks when the split information indicates that the current block is to be split; determining lower horizontal coding order information of the sub-blocks of the current block according to higher horizontal coding order information applied to the current block, based on at least one of split information, size information, and neighboring block information of the current block; and decoding the sub-blocks according to the lower horizontal coding order information.

MODE OF DISCLOSURE

Advantages and features of embodiments set forth herein and methods of achieving them will be apparent from the following description of embodiments in conjunction with the accompanying drawings. However, the present disclosure is not limited to embodiments set forth herein and may be embodied in many different forms. The embodiments are merely provided so that this disclosure will be thorough and complete and will fully convey the scope of the disclosure to those of ordinary skill in the art.

The terms used herein will be briefly described and then embodiments set forth herein will be described in detail.

In the present specification, general terms that have been widely used nowadays are selected, when possible, in consideration of functions of the present disclosure, but nongeneral terms may be selected according to the intentions of technicians in the this art, precedents, or new technologies, etc. Some terms may be arbitrarily chosen by the present applicant. In this case, the meanings of these terms will be explained in corresponding parts of the disclosure in detail. Thus, the terms used herein should be defined not based on the names thereof but based on the meanings thereof and the whole context of the present disclosure.

As used herein, the singular forms "a", "an" and "the" are intended to include the plural forms as well, unless the context clearly indicates otherwise.

It will be understood that when an element is referred to as "including" another element, the element may further include other elements unless mentioned otherwise. The term "unit" used herein should be understood as software or a hardware component, such as a FPGA or an ASIC, which performs certain functions. However, the term "unit" is not limited to software or hardware. The term "unit" may be configured to be stored in an addressable storage medium or to reproduce one or more processors. Thus, the term "unit" may include, for example, components, such as software components, object-oriented software components, class components, and task components, processes, functions, attributes, procedures, subroutines, segments of program code, drivers, firmware, microcode, a circuit, data, database, data structures, tables, arrays, and parameters. Functions provided in components and "units" may be combined to a small number of components and "units" or may be divided into sub-components and "sub-units".

The term "current block" refers to a coding unit, a prediction unit, or a transform unit that is being currently encoded or decoded. For convenience of explanation, when it is necessary to distinguish between other types of blocks such as a prediction unit, a transform unit, and the like, terms "current coding block", "current prediction block", and "current transform block" may be used. The term "sub-block" refers to a data unit split from a "current block". The "upper block" refers to a data unit including the "current block".

The term "sample", when used herein, refers to data allocated to a sampling position of an image, i.e., data to be processed. For example, samples may be pixel values in a spatial domain, and transform coefficients in a transform domain. A unit including at least one sample may be defined as a block.

Hereinafter, embodiments of the disclosure will be described in detail with reference to the accompanying drawings, so that the embodiments of the disclosure may be easily implemented by those of ordinary skill in the art. For clarity, parts irrelevant to a description of the present disclosure are omitted in the drawings.

FIG. 1A is a block diagram of a video encoding apparatus 100 based on coding units of a tree structure, according to an embodiment of the present disclosure.

The video encoding apparatus 100 includes a largest coding unit determiner 110, a coding unit determiner 120, and an outputter 130.

The largest coding unit determiner 110 splits a picture or a slice included in the picture into a plurality of largest coding units according to sizes of the largest coding units. The largest coding units may be data units having a size of 32×32, 64×64, 128×128, 256×256 or the like, and may each be a square data unit having a width and length in powers of 2. The largest coding unit determiner 110 may provide the outputter 130 with largest coding unit size information indicating the size of the largest coding units. The outputter 130 may include the largest coding unit size information in a bitstream.

The coding unit determiner 120 determines coding units by splitting the largest coding unit. The coding units may be determined, based on a maximum size and a depth. The depth may be defined as the number of times of spatially splitting a largest coding unit into coding units. Each time the depth is increased by 1, a coding unit is split into two or more coding units. Therefore, as the depth is increased, the size of a coding unit for each depth decreases. Whether to split a coding unit is determined according to whether it is efficient to split the coding unit by rate-distortion optimization. In addition, split information indicating whether the coding unit is split may be generated. The split information may be expressed in the form of a flag.

A coding unit may be split in various ways. For example, a square coding unit may be split into four square coding units, the width and height of which are half those of the square coding unit. The square coding unit may be split into two rectangular coding units having a width half that of the square coding unit. The square coding unit may be split into two rectangular coding units having a height half that of the square coding unit. The square coding unit may be split into three coding units by splitting the width or height thereof into a ratio of 1:2:1.

A rectangular coding unit having a width twice a height thereof may be split into two square coding units. A rectangular coding unit having a width twice a height thereof may be split into two square coding units having a width four times a height thereof. A rectangular coding unit having a width twice a height thereof may be split into two rectangular coding units and one square coding unit by splitting the width of the rectangular coding unit into a ratio of 1:2:1.

Equally, a rectangular coding unit having a height twice a width thereof may be split into two square coding units. A rectangular coding unit having a height twice a width thereof may be split into two rectangular coding units having a height four times a width thereof. Equally a rectangular coding unit having a height twice a width thereof may be split into two rectangular coding units and one square coding unit by splitting the height of the rectangular coding unit into a ratio of 1:2:1.

When two or more split methods are applicable to the video encoding apparatus 100, information regarding a split method applicable to a coding unit among the split methods applicable to the video encoding apparatus 100 may be determined for each picture. Thus, only specific split methods may be determined to be used for each picture. When the video encoding apparatus 100 employs only one split method, information regarding a split method applicable to a coding unit is not additionally determined.

When the split information of the coding unit indicates that the coding unit is to be split, split shape information indicating a splitting method of the coding unit may be generated. When there is only one split method applicable to a picture to which the coding unit belongs, the split shape information may not be generated. When a split method is adaptively determined based on encoding information regarding the vicinity of the coding unit, the split shape information may not be generated.

A largest coding unit may be split up to smallest coding units according to smallest coding unit size information. A depth of the largest coding unit may be defined as a highest depth, and a depth of the smallest coding unit may be defined as a lowest depth. Therefore, a coding unit of a higher depth may include coding units of a lower depth.

As described above, image data of a current picture is split into largest coding units according to a maximum size of the coding unit. The largest coding unit may include coding units split according to depths. Because the largest coding unit is split according to depths, image data of a spatial domain included in the largest coding unit may be hierarchically classified according to the depths.

A maximum depth or a minimum size of a coding unit that limits a maximum number of times of hierarchically splitting the largest coding unit may be predetermined.

The coding unit determiner 120 compares coding efficiency when the coding unit is hierarchically split from coding efficiency when the coding unit is not split. The coding unit determiner 120 determines whether to split the coding unit according to the result of comparison. When it is determined that it is more efficient to split the coding unit, the coding unit determiner 120 hierarchically splits the coding unit. The coding unit is not split when the result of comparison reveals that it is efficient not to split the coding unit. Whether to split the coding unit may be determined independently of whether to split other coding units adjacent to the coding unit.

In an embodiment, whether to split a coding unit may be determined in an encoding process, starting from a coding unit of a larger depth. For example, coding efficiency of a coding unit of a maximum depth is compared with that of a coding unit of a depth smaller by 1 than the maximum depth. In each region of the largest coding unit, whether either coding units of the maximum depth or coding units of the depth smaller by 1 than the maximum depth are more efficiently encoded is determined. Whether in each region of the largest coding unit, the coding unit of the depth smaller by 1 than the maximum depth are to be split is determined, based on a result of determination. Thereafter, whether in each region of the largest coding unit, either coding units of a depth smaller by 2 than the maximum depth or a combination of the coding units of the depth smaller by 1 than the maximum depth, which are selected based on the result of determination, and coding units of a minimum depth is more efficiently encoded is determined. The same determination process is sequentially performed on coding units of a small depth, and finally, whether to split the largest coding unit is determined, based on whether the largest coding unit or a hierarchical structure obtained by hierarchically splitting the largest coding unit is more efficiently encoded.

Whether to split a coding unit may be determined in an encoding process, starting from a coding unit of a smaller depth. For example, coding efficiency of a largest coding unit is compared with that of coding units of a depth greater by 1 than a depth of the largest coding unit to determine whether either the largest coding unit or the coding units of the depth greater by 1 than the depth of the largest coding unit are more efficiently encoded is determined. When the coding efficiency of the largest coding unit is better, the largest coding unit is not split. When the coding efficiency of coding units of the depth greater by 1 than that of the largest coding unit, the largest coding unit is split and the same comparison process is repeatedly performed on coding units split from the largest coding unit.

When coding efficiency is considered starting from a coding unit of a higher depth, a tree structure, the amount of calculation of which is large and coding efficiency of which is high may be obtained. In contrast, when coding efficiency is considered starting from a coding unit of a lower depth, a tree structure, the amount of calculation of which is small and coding efficiency of which is low may be obtained. Therefore, an algorithm for obtaining a hierarchical tree structure of a largest coding unit may be designed in various ways, in consideration of coding efficiency and the amount of calculation.

The coding unit determiner 120 determines a prediction method and a transformation method which are most effective for a coding unit so as to determine efficiency of a coding unit for each depth. The coding unit may be split into certain data units to determine the most efficient prediction method and transformation method. The shape of the data units may vary according to a splitting method of the coding unit. A splitting method of a coding unit for determining a data unit may be defined as a partition mode. For example, when a 2N×2N coding unit (here, N is a positive integer) is not split, the size of a prediction unit included in the coding unit is 2N×2N. When the 2N×2N coding unit is split, the size of the prediction unit included in the coding unit may be 2N×N, N×2N, N×N, or the like according to the partition mode. In an embodiment, in the partition mode, it is possible to produce data units by splitting a height or width of a coding unit into a symmetrical ratio or an asymmetric ratio, e.g., 1:n or n:1, splitting the coding unit in a diagonal direction, or splitting the coding unit into other geometric shapes, or produce data units of arbitrary shape.

A coding unit may be predicted and transformed, based on the data unit included therein. However, in an embodiment, a data unit for prediction and a data unit for transformation may be separately determined. The data unit for prediction may be defined as a prediction unit, and the data unit for transformation may be defined as a transform unit. A partition mode applied to the prediction unit and a partition mode applied to the transform unit may be different from each other. Prediction of the prediction unit and transformation of the transform in the coding unit may be performed in a parallel and independent manner The coding unit may be split into one or more prediction units to determine an efficient prediction method. Similarly, the coding unit may be split into one or more transform units to determine an efficient transformation method. Splitting of the prediction unit and splitting of the transform unit may be performed independently. However, when a reconstructed sample in the coding unit is used for intra prediction, there is a dependent relationship between prediction units or transform units included in the coding unit and thus the prediction units and the transform units may affect each other when split.

The prediction units included in the coding unit may be predicted by intra prediction or inter prediction. Intra prediction is a method of predicting samples of a prediction unit by using reference samples around the prediction unit. Inter prediction is a method of predicting samples of a prediction unit by obtaining a reference sample from a reference picture referenced for a current picture.

For intra prediction, the coding unit determiner 120 may select a most efficient intra prediction method by applying a plurality of intra prediction methods to a prediction unit. Intra prediction methods include a DC mode, a planar mode, a directional mode such as a vertical mode and a horizontal mode, or the like.

Intra prediction may be performed for each prediction unit when a reconstructed sample around a coding unit is used as a reference sample. However, when a reconstructed sample in the coding unit is used as a reference sample, a reference sample in the coding unit should be first reconstructed and thus a prediction order of a prediction unit may be subordinate to a transformation order of a transform unit. Therefore, when the reconstructed sample in the coding unit is used as a reference sample, only an intra prediction method for transform units corresponding to the prediction unit is determined for the prediction unit and intra prediction may be performed substantially for each transform unit.

The coding unit determiner 120 may select a most efficient inter prediction method by determining an optimal motion vector and a reference picture. For inter prediction, the coding unit determiner 120 may determine a plurality of motion vector candidates among coding units spatially and temporally neighboring to a current coding unit, and determine a most efficient motion vector as a motion vector among the plurality of motion vector candidates. Similarly, a plurality of reference picture candidates may be determined among the coding units spatially and temporally neighboring to the current coding unit, and a most efficient reference picture may be determined among the plurality of reference picture candidates. In an embodiment, a reference picture may be determined from a reference picture list determined in advance for a current picture. In an embodiment, for accurate prediction, a most efficient motion vector among a plurality of motion vector candidates may be determined as a predicted motion vector and a motion vector may be determined by correcting the predicted motion vector. Inter prediction may be parallel performed for each prediction unit included in a coding unit.

The coding unit determiner 120 may reconstruct a coding unit by obtaining only information representing a motion vector and a reference picture according to a skip mode. According to the skip mode, all encoding information, including a residual signal, is omitted except for the information representing the motion vector and the reference picture. Because the residual signal is omitted, the skip mode is applicable when the accuracy of prediction is very high.

The partition mode to be used may be limited according to a prediction method for a prediction unit. For example, only a partition mode for prediction units having sizes of 2N×2N and N×N may be applied to intra prediction, while a partition mode for prediction units having sizes of 2N×2N, 2N×N, N×2N and N×N may be applied to inter prediction. In addition, only a partition mode for a prediction unit having a size of 2N×2N may be applied to a skip mode of inter prediction. A partition mode allowed for each prediction method in the video encoding apparatus 100 may be changed according to coding efficiency.

The video encoding apparatus 100 may perform transformation based on a coding unit or a transform unit included in the coding unit. The video encoding apparatus 100 may transform residual data, which is the differences between original values of pixels included in a coding unit and predicted values thereof, by a certain process. For example, the video encoding apparatus 100 may perform lossy compression on the residual data by quantization and DCT/DST transformation. Alternatively, the video encoding apparatus 100 may perform lossless compression on the residual data without quantization.

The video encoding apparatus 100 may determine a transform unit most efficient for quantization and transformation. Similar to a coding unit of a tree structure, a transform unit included in a coding unit may be recursively split into smaller sized transform units and thus residual data in the coding unit may be split according to a transformation depth, based on the transform units of a tree structure. In addition, the video encoding apparatus 100 may generate transform split information regarding splitting of the coding unit and the transform unit according to a determined tree structure of the transform unit.

The video encoding apparatus 100 may set a transformation depth indicating the number of times of splitting until the height and width of the coding unit are split to obtain transform units. For example, a transformation depth may be set to 0 when a transform unit of a 2N×2N current coding unit has a size of 2N×2N, be set to 1 when the transform unit has a size of N×N, and be set to 2 when the transform unit has a size of N/2×N/2. That is, a transform unit of a tree structure may be set according to a transformation depth.

In conclusion, the coding unit determiner 120 determines a prediction method most efficient for a current prediction unit, the prediction method being from among intra prediction methods and inter prediction methods. The coding unit determiner 120 determines a prediction unit determination method according to coding efficiency according to a prediction result. Equally, the coding unit determiner 120 determines a transform unit determination method according to coding efficiency according to a transformation result. Coding efficiency of the coding unit is finally determined according to the most efficient prediction unit determination method and transform unit determination method. The coding unit determiner 120 determines a hierarchical structure of a largest coding unit according to coding efficiency of a coding unit for each depth.

The coding unit determiner 120 may measure coding efficiency of coding units according to depths, prediction efficiency of prediction methods, etc. by using a Lagrangian multiplier-based rate-distortion optimization technique.

The coding unit determiner 120 may generate split information indicating whether a coding unit is split according to a depth, based on the determined hierarchical structure of the largest coding unit. The coding unit determiner 120 may generate partition mode information for determining a prediction unit and transform unit split information for determining a transform unit with respect to a split coding unit. When there are two or more splitting methods of a coding unit, the coding unit determiner 120 may generate split shape information indicating a splitting method, together with split information. In addition, the coding unit determiner 120 may generate information regarding a prediction method and a transformation method used for a prediction unit and a transform unit.

The outputter 130 may output information generated by the largest coding unit determiner 110 and the coding unit determiner 120 in the form of a bitstream, based on a hierarchical structure of a largest coding unit.

A method of determining a coding unit, a prediction unit, and a transform unit according to a tree structure of a largest coding unit according to an embodiment will be described in detail with reference to FIGS. 3 to 12 below.

Figure 1B:
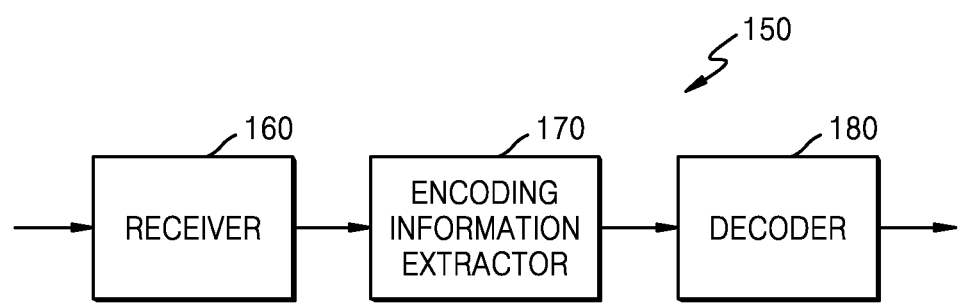
FIG. 1B is a block diagram of a video decoding apparatus based on coding units of a tree structure, according to an embodiment.

FIG. 1B is a block diagram of a video decoding apparatus 150 based on coding units of a tree structure, according to an embodiment.

The video decoding apparatus 150 includes a receiver 160, an encoding information extractor 170, and a decoder 180.

Various terms such as "coding unit", "depth", "prediction unit", "transform unit", and various "split information" related to a decoding operation of the video decoding apparatus 150 according to an embodiment are as described above with reference to FIG. 1 and the video encoding apparatus 100. In addition, the video decoding apparatus 150 is configured to restore image data and thus various encoding methods used in the video encoding apparatus 100 are applicable to the video decoding apparatus 150.

The receiver 160 receives and parses a bitstream of an encoded video. The encoding information extractor 170 extracts information necessary to decode each largest coding unit from the parsed bitstream and provides the information to the decoder 180. The encoding information extractor 170 may extract information regarding a maximum size of a coding unit of a current picture from a header, a sequence parameter set, or a picture parameter set for the current picture.

In addition, the encoding information extractor 170 extracts a final depth and split information of coding units of a tree structure for each largest coding unit from the parsed bitstream. The extracted final depth and split information are output to the decoder 180. The decoder 180 may determine a tree structure of a largest coding unit by splitting the largest coding unit according to the extracted final depth and split information.

The split information extracted by the encoding information extractor 170 is split information of a tree structure determined by the video encoding apparatus 100 to generate a minimum encoding error. Therefore, the video decoding apparatus 150 may reconstruct an image by decoding data according to an encoding method that generates the minimum encoding error.

The encoding information extractor 170 may extract split information regarding a data unit such as a prediction unit and a transform unit included in a coding unit. For example, the encoding information extractor 170 may extract information regarding a most efficient partition mode for a prediction unit. The encoding information extractor 170 may extract transform partition information of a tree structure most efficient for a transform unit.

The encoding information extractor 170 may obtain information regarding a prediction method most efficient for prediction units split from a coding unit. The encoding information extractor 170 may obtain information regarding a transformation method most efficient for transform units split from a coding unit.

The encoding information extractor 170 extracts information from the bitstream according to a method of configuring the bitstream by the outputter 130 of the video encoding apparatus 100.

The decoder 180 may split a largest coding unit into coding units of a most efficient tree structure, based on the split information. The decoder 180 may split a coding unit into prediction units according to information regarding a partition mode. The decoder 180 may split the coding unit into transform units according to the transform split information.

The decoder 180 may predict a prediction unit according to information regarding a prediction method. The decoder 180 may perform inverse quantization and inverse transformation on residual data corresponding to the difference an original value and a predicted value of a pixel, based on information a method of transforming a transform unit. In addition, the decoder 180 may reconstruct pixels of a coding unit according to a result of predicting a prediction unit and a result of transforming a transform unit.

Figure 2:
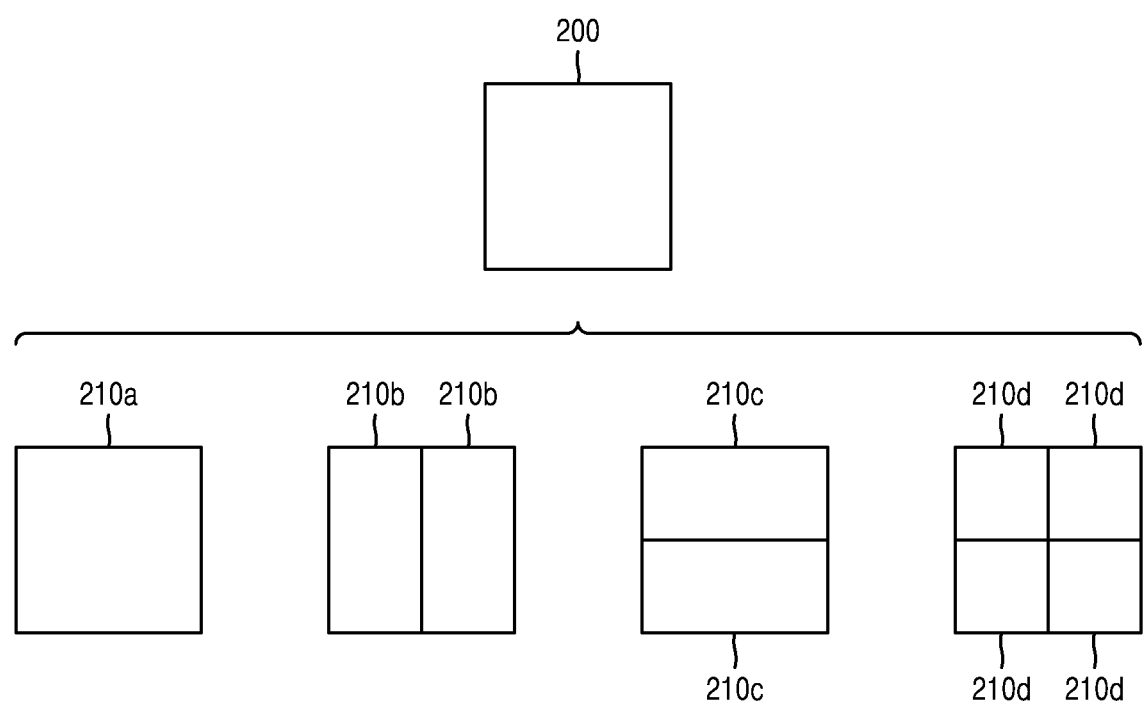
FIG. 2 illustrates a process of determining at least one coding unit by splitting a current coding unit, according to an embodiment.

FIG. 2 illustrates a process of determining at least one coding unit by splitting a current coding unit by the video decoding apparatus 150, according to an embodiment.

In an embodiment, the video decoding apparatus 150 may determine a shape of a coding unit by using block shape information and determine a shape into which the coding unit is to be split by using split shape information. That is, a coding-unit splitting method indicated by the split type information may be determined based on a block shape indicated by the block shape information employed by the video decoding apparatus 150.

According to an embodiment, the video decoding apparatus 150 may use the block shape information indicating that the current coding unit has a square shape. For example, the video decoding apparatus 150 may determine whether not to split a square coding unit, whether to vertically split the square coding unit, whether to horizontally split the square coding unit, or whether to split the square coding unit into four coding units, based on the split shape information. Referring to FIG. 2, when the block shape information of a current coding unit 200 indicates a square shape, the decoder 180 may determine that a coding unit 210*a* having the same size as the current coding unit 200 is not split, based on the split shape information indicating not to perform splitting, or may determine coding units 210*b*, 210*c*, or 210*d* split based on the split shape information indicating a predetermined splitting method.

Referring to FIG. 2, according to an embodiment, the video decoding apparatus 150 may determine two coding units 210*b* obtained by splitting the current coding unit 200 in a vertical direction, based on the split shape information indicating to perform splitting in a vertical direction. The video decoding apparatus 150 may determine two coding units 210*c* obtained by splitting the current coding unit 200 in a horizontal direction, based on the split shape information indicating to perform splitting in a horizontal direction. The video decoding apparatus 150 may determine four coding units 210*d* obtained by splitting the current coding unit 200 in vertical and horizontal directions, based on the split shape information indicating to perform splitting in vertical and horizontal directions. However, splitting methods of the square coding unit are not limited to the above-described methods, and the split shape information may indicate various methods. Predetermined splitting methods of splitting the square coding unit will be described in detail below in relation to various embodiments.

Figure 3:
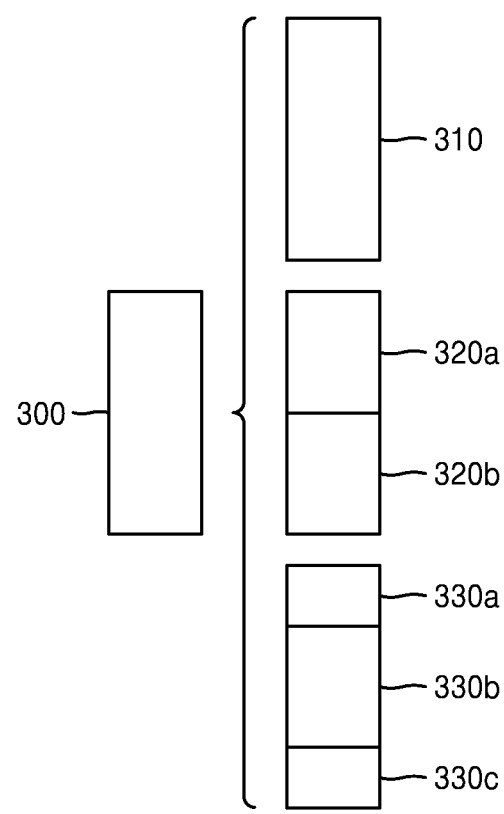
FIG. 3 illustrates a process of determining at least one coding unit by splitting a non-square coding unit, according to an embodiment.
Figure 3:
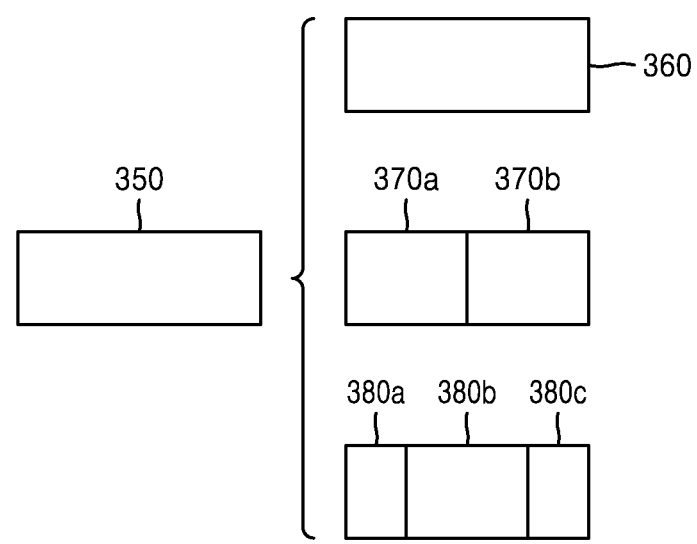

FIG. 3 illustrates a process, performed by the video decoding apparatus 150, of determining at least one coding unit by splitting a non-square coding unit, according to an embodiment.

According to an embodiment, the video decoding apparatus 150 may use block shape information indicating that a current coding unit has a non-square shape. The video decoding apparatus 150 may determine whether not to split the non-square current coding unit or whether to split the non-square current coding unit by using a predetermined splitting method, based on split shape information. Referring to FIG. 3, when the block shape information of a current coding unit 300 or 350 indicates a non-square shape, the video decoding apparatus 150 may determine that a coding unit 310 or 360 having the same size as the current coding unit 300 or 350 is not split, based on the split shape information indicating not to perform splitting, or determine coding units 320*a* and 320*b*, 330*a* to 330*c*, 370*a* and 370*b*, or 380*a* to 380*c* split based on the split shape information indicating a predetermined splitting method. Predetermined splitting methods of splitting a non-square coding unit will be described in detail below in relation to various embodiments.

According to an embodiment, the video decoding apparatus 150 may determine a splitting method of a coding unit by using the split shape information and, in this case, the split shape information may indicate the number of one or more coding units generated by splitting a coding unit. Referring to FIG. 3, when the split shape information indicates to split the current coding unit 300 or 350 into two coding units, the video decoding apparatus 150 may determine two coding units 320*a* and 320*b*, or 370*a* and 370*b* included in the current coding unit 300 or 350, by splitting the current coding unit 300 or 350 based on the split shape information.

According to an embodiment, when the video decoding apparatus 150 splits the non-square current coding unit 300 or 350 based on the split shape information, the location of a long side of the non-square current coding unit 300 or 350 may be considered. For example, the video decoding apparatus 150 may determine a plurality of coding units by dividing a long side of the current coding unit 300 or 350, in consideration of the shape of the current coding unit 300 or 350.

According to an embodiment, when the split shape information indicates to split a coding unit into an odd number of blocks, the video decoding apparatus 150 may determine an odd number of coding units included in the current coding unit 300 or 350. For example, when the split shape information indicates to split the current coding unit 300 or 350 into three coding units, the video decoding apparatus 150 may split the current coding unit 300 or 350 into three coding units 330*a*, 330*b*, and 330*c*, or 380*a*, 380*b*, and 380*c*. According to an embodiment, the video decoding apparatus 150 may determine an odd number of coding units included in the current coding unit 300 or 350, and not all the determined coding units may have the same size. For example, a predetermined coding unit 330*b* or 380*b* from among the determined odd number of coding units 330*a*, 330*b*, and 330*c*, or 380*a*, 380*b*, and 380*c* may have a size different from the size of the other coding units 330*a* and 330*c*, or 380*a* and 380*c*. That is, coding units which may be determined by splitting the current coding unit 300 or 350 may have multiple sizes and, in some cases, all of the odd number of coding units 330*a*, 330*b*, and 330*c*, or 380*a*, 380*b*, and 380*c* may have different sizes.

According to an embodiment, when the split shape information indicates to split a coding unit into an odd number of blocks, the video decoding apparatus 150 may determine an odd number of coding units included in the current coding unit 300 or 350, and may put a predetermined restriction on at least one coding unit from among the odd number of coding units generated by splitting the current coding unit 300 or 350. Referring to FIG. 3, the video decoding apparatus 150 may allow a decoding method of the coding unit 330*b* or 380*b* to be different from that of the other coding units 330*a* and 330*c*, or 380*a* and 380*c*, wherein the coding unit 330*b* or 380*b* is at a center location from among the three coding units 330*a*, 330*b*, and 330*c*, or 380*a*, 380*b*, and 380*c* generated by splitting the current coding unit 300 or 350. For example, the video decoding apparatus 150 may restrict the coding unit 330*b* or 380*b* at the center location to be no longer split or to be split only a predetermined number of times, unlike the other coding units 330*a* and 330*c*, or 380*a* and 380*c*.

Figure 4:
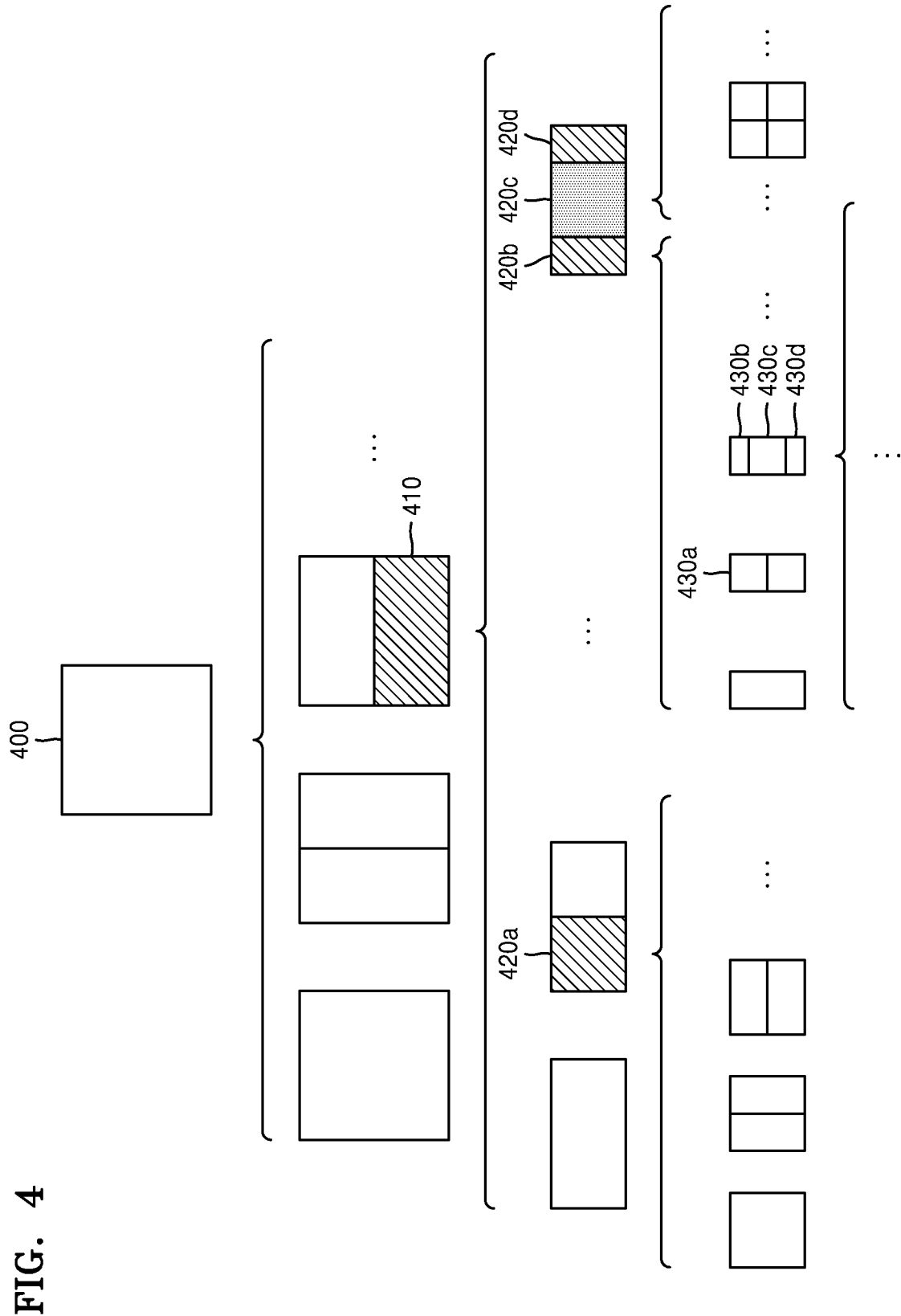
FIG. 4 illustrates a process of splitting a coding unit based on at least one of block shape information and split shape information, according to an embodiment.

FIG. 4 illustrates a process, performed by the video decoding apparatus 150, of splitting a coding unit based on at least one of block shape information and split shape information, according to an embodiment.

According to an embodiment, the video decoding apparatus 150 may determine to split or not to split a square first coding unit 400 into coding units, based on at least one of the block shape information and the split shape information. According to an embodiment, when the split shape information indicates to split the first coding unit 400 in a horizontal direction, the video decoding apparatus 150 may determine a second coding unit 410 by splitting the first coding unit 400 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the structure of the first coding unit, the second coding unit, and the third coding unit follows the above descriptions.

According to an embodiment, the video decoding apparatus 150 may determine to split or not to split the determined second coding unit 410 into coding units, based on at least one of the block shape information and the split shape information. Referring to FIG. 4, the video decoding apparatus 150 may or may not split the non-square second coding unit 410, which is determined by splitting the first coding unit 400, into one or more third coding units 420*a*, or 420*b*, 420*c*, and 420*d* based on at least one of the block shape information and the split shape information. The video decoding apparatus 150 may obtain at least one of the block shape information and the split shape information, and determine a plurality of various-shaped second coding units (e.g., 410) by splitting the first coding unit 400, based on the obtained at least one of the block shape information and the split shape information, and the second coding unit 410 may be split by using the splitting method of the first coding unit 400, based on at least one of the block shape information and the split shape information. According to an embodiment, when the first coding unit 400 is split into the second coding units 410 based on at least one of the block shape information and the split shape information of the first coding unit 400, the second coding unit 410 may also be split into the third coding units 420*a*, or 420*b*, 420*c*, and 420*d* based on at least one of the block shape information and the split shape information of the second coding unit 410. That is, a coding unit may be recursively split based on at least one of the block shape information and the split shape information of each coding unit. A method that may be used to recursively split a coding unit will be described below in relation to various embodiments.

According to an embodiment, the video decoding apparatus 150 may determine to split each of the third coding units 420*a*, or 420*b*, 420*c*, and 420*d* into coding units or not to split the second coding unit 410, based on at least one of the block shape information and the split shape information. According to an embodiment, the video decoding apparatus 150 may split the non-square second coding unit 410 into the odd number of third coding units 420*b*, 420*c*, and 420*d*. The video decoding apparatus 150 may put a predetermined restriction on a predetermined third coding unit from among the odd number of third coding units 420*b*, 420*c*, and 420*d*. For example, the video decoding apparatus 150 may restrict the third coding unit 420*c* at a center location from among the odd number of third coding units 420*b*, 420*c*, and 420*d* to be no longer split or to be split a settable number of times. Referring to FIG. 4, the video decoding apparatus 150 may restrict the third coding unit 420*c*, which is at the center location from among the odd number of third coding units 420*b*, 420*c*, and 420*d* included in the non-square second coding unit 410, to be no longer split, to be split by using a predetermined splitting method (e.g., split into only four coding units or split by using a splitting method of the second coding unit 410), or to be split only a predetermined number of times (e.g., split only n times (where n>0)). However, the restrictions on the third coding unit 420*c* at the center location are not limited to the above-described examples, and may include various restrictions for decoding the third coding unit 420c at the center location differently from the other third coding units 420b and 420d.

According to an embodiment, the video decoding apparatus 150 may obtain at least one of the block shape information and the split shape information, which is used to split a current coding unit, from a predetermined location in the current coding unit.

Figure 13:
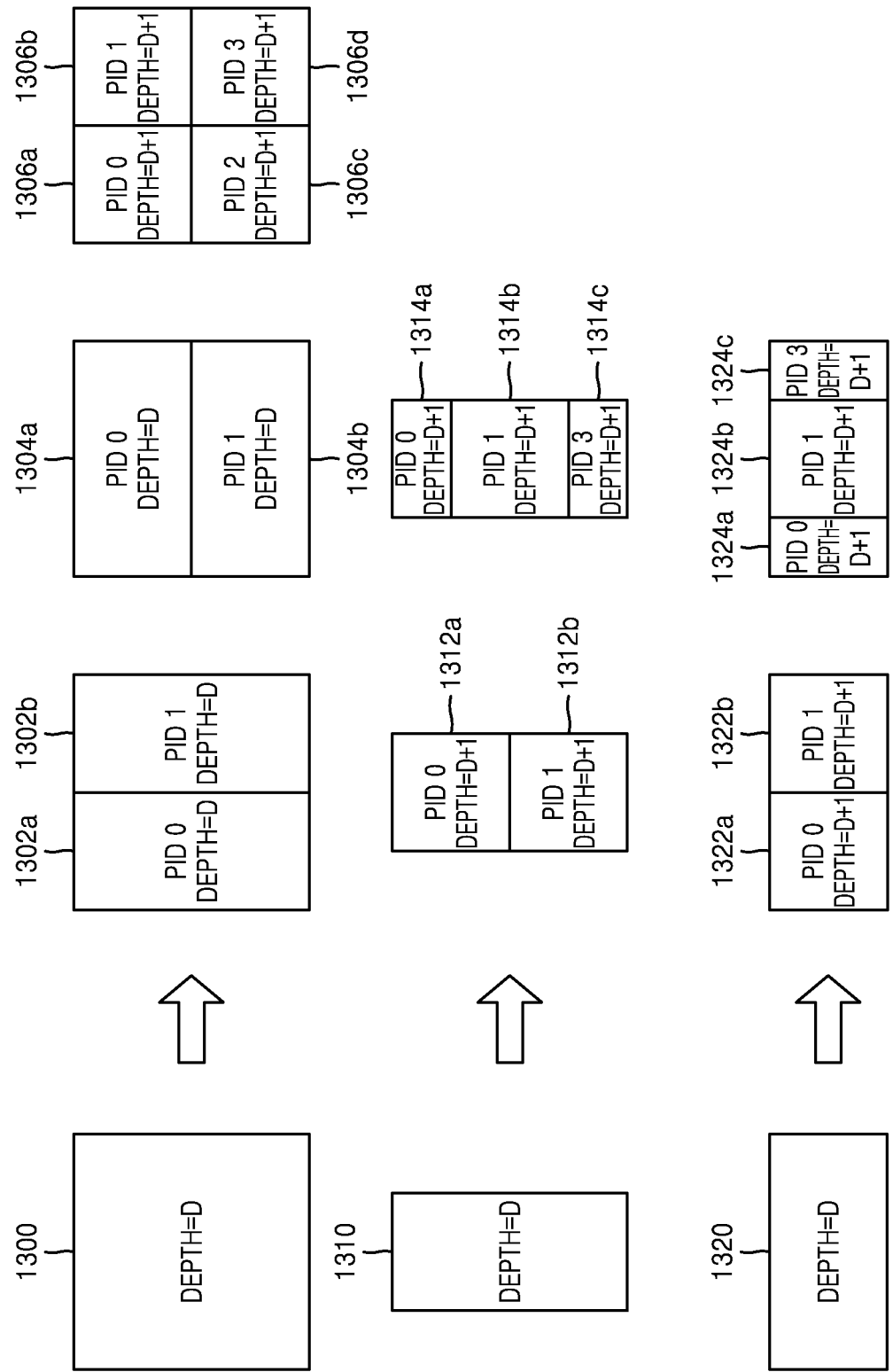
FIG. 13 illustrates depths that are determinable based on shapes and sizes of coding units, and part indexes (PIDs) that are for distinguishing the coding units, according to an embodiment.

FIG. 13 illustrates a method, performed by the video decoding apparatus 150, of determining a predetermined coding unit from among an odd number of coding units, according to an embodiment. Referring to FIG. 13, at least one of block shape information and split shape information of a current coding unit 1300 may be obtained from a sample of a predetermined location from among a plurality of samples included in the current coding unit 1300 (e.g., a sample 1340 of a center location). However, the predetermined location in the current coding unit 1300, from which at least one of the block shape information and the split shape information may be obtained, is not limited to the center location in FIG. 13, and may include various locations included in the current coding unit 1300 (e.g., top, bottom, left, right, top left, bottom left, top right, and bottom right locations). The video decoding apparatus 150 may obtain at least one of the block shape information and the split shape information from the predetermined location and determine to split or not to split the current coding unit into various-shaped and various-sized coding units.

According to an embodiment, when the current coding unit is split into a predetermined number of coding units, the video decoding apparatus 150 may select one of the coding units. Various methods may be used to select one of a plurality of coding units, as will be described below in relation to various embodiments.

According to an embodiment, the video decoding apparatus 150 may split the current coding unit into a plurality of coding units, and may determine a coding unit at a predetermined location.

Figure 5:
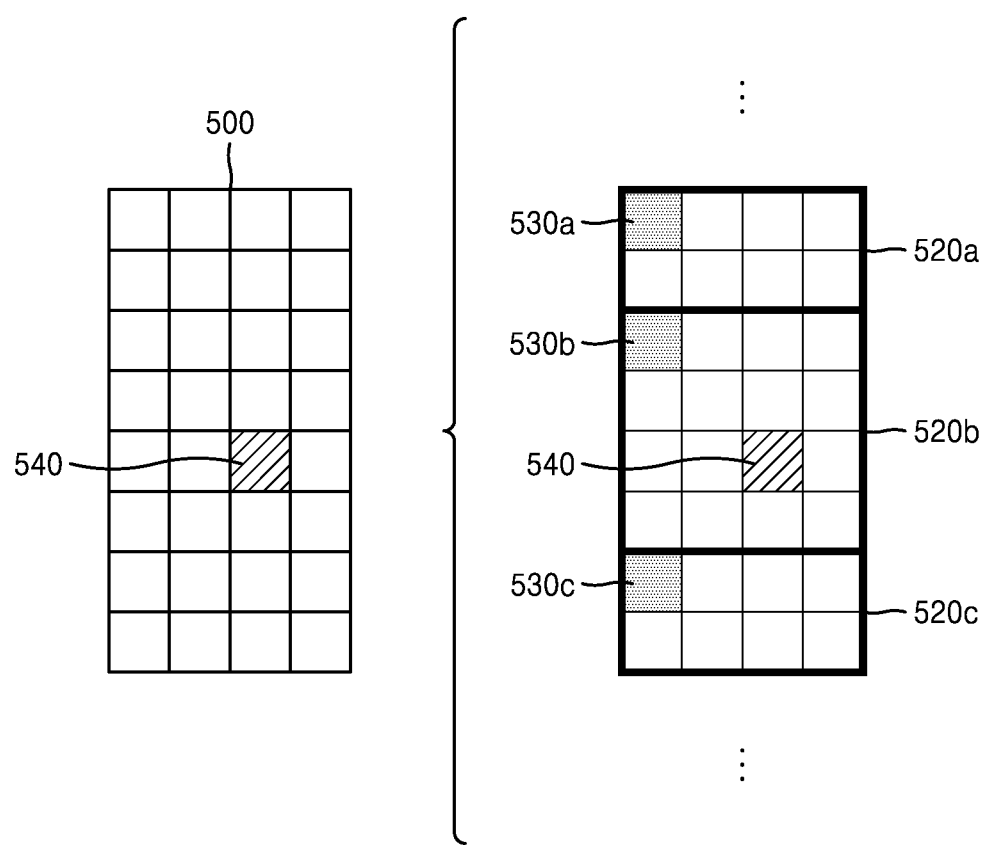
FIG. 5 illustrates a method of determining a predetermined coding unit from among an odd number of coding units, according to an embodiment.

FIG. 5 illustrates a method, performed by the video decoding apparatus 150, of determining a coding unit of a predetermined location from among an odd number of coding units, according to an embodiment.

According to an embodiment, the video decoding apparatus 150 may use information indicating locations of the odd number of coding units, to determine a coding unit at a center location from among the odd number of coding units. Referring to FIG. 5, the video decoding apparatus 150 may determine an odd number of coding units 520a, 520b, and 520c by splitting the current coding unit 500. The video decoding apparatus 150 may determine a coding unit 1320b at a center location by using information about locations of the odd number of coding units 1320a to 1320c. For example, the video decoding apparatus 150 may determine the coding unit 520b of the center location by determining the locations of the coding units 520a, 520b, and 520c based on information indicating locations of predetermined samples included in the coding units 520a, 520b, and 520c. In detail, the video decoding apparatus 150 may determine the coding unit 520b at the center location by determining the locations of the coding units 520a, 520b, and 520c based on information indicating locations of top left samples 530a, 530b, and 530c of the coding units 520a, 520b, and 520c.

According to an embodiment, the information indicating the locations of the top left samples 530a, 530b, and 530c, which are included in the coding units 520a, 520b, and 520c, respectively, may include information about locations or coordinates of the coding units 520a, 520b, and 520c in a picture. According to an embodiment, the information indicating the locations of the top left samples 530a, 530b, and 530c, which are included in the coding units 520a, 520b, and 520c, respectively, may include information indicating widths or heights of the coding units 520a, 520b, and 520c included in the current coding unit 500, and the widths or heights may correspond to information indicating differences between the coordinates of the coding units 520a, 520b, and 520c in the picture. That is, the video decoding apparatus 150 may determine the coding unit 520b at the center location by directly using the information about the locations or coordinates of the coding units 520a, 520b, and 520c in the picture, or by using the information about the widths or heights of the coding units, which correspond to the difference values between the coordinates.

According to an embodiment, information indicating the location of the top left sample 530a of the upper coding unit 520a may include coordinates (xa, ya), information indicating the location of the top left sample 530b of the middle coding unit 520b may include coordinates (xb, yb), and information indicating the location of the top left sample 530c of the lower coding unit 520c may include coordinates (xc, yc). The video decoding apparatus 150 may determine the middle coding unit 520b by using the coordinates of the top left samples 530a, 530b, and 530c which are included in the coding units 520a, 520b, and 520c, respectively. For example, when the coordinates of the top left samples 530a, 530b, and 530c are sorted in an ascending or descending order, the coding unit 520b including the coordinates (xb, yb) of the sample 530b at a center location may be determined as a coding unit at a center location from among the coding units 520a, 520b, and 520c determined by splitting the current coding unit 500. However, the coordinates indicating the locations of the top left samples 530a, 530b, and 530c may include coordinates indicating absolute locations in the picture, or may use coordinates (dxb, dyb) indicating a relative location of the top left sample 530b of the middle coding unit 520b and coordinates (dxc, dyc) indicating a relative location of the top left sample 530c of the lower coding unit 520c with reference to the location of the top left sample 530a of the upper coding unit 520a. A method of determining a coding unit at a predetermined location by using coordinates of a sample included in the coding unit, as information indicating a location of the sample, is not limited to the above-described method, and may include various arithmetic methods capable of using the coordinates of the sample.

According to an embodiment, the video decoding apparatus 150 may split the current coding unit 500 into a plurality of coding units 520a, 520b, and 520c, and may select one of the coding units 520a, 520b, and 520c based on a predetermined criterion. For example, the video decoding apparatus 150 may select the coding unit 520b, which has a size different from that of the others, from among the coding units 520a, 520b, and 520c.

According to an embodiment, the video decoding apparatus 150 may determine the widths or heights of the coding units 520a, 520b, and 520c by using the coordinates (xa, ya) indicating the location of the top left sample 530a of the upper coding unit 520a, the coordinates (xb, yb) indicating the location of the top left sample 530b of the middle coding unit 520b, and the coordinates (xc, yc) indicating the location of the top left sample 530c of the lower coding unit 520c. The video decoding apparatus 150 may determine the respective sizes of the coding units 520a, 520b, and 520c by using the coordinates (xa, ya), (xb, yb), and (xc, yc) indicating the locations of the coding units 520a, 520b, and 520c.

According to an embodiment, the video decoding apparatus 150 may determine the width of the upper coding unit 520a to be xb-xa and determine the height thereof to be yb-ya. According to an embodiment, the video decoding apparatus 150 may determine the width of the middle coding unit 520b to be xc-xb and determine the height thereof to be yc-yb. According to an embodiment, the video decoding apparatus 150 may determine the width or height of the lower coding unit 520c by using the width or height of the current coding unit 500 or the widths or heights of the upper and middle coding units 520a and 520b. The video decoding apparatus 150 may determine a coding unit, which has a size different from that of the others, based on the determined widths and heights of the coding units 520a to 520c. Referring to FIG. 5, the video decoding apparatus 150 may determine the middle coding unit 520b, which has a size different from the size of the upper and lower coding units 520a and 520c, as the coding unit of the predetermined location. However, the above-described method, performed by the video decoding apparatus 150, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

However, locations of samples considered to determine locations of coding units are not limited to the above-described top left locations, and information about arbitrary locations of samples included in the coding units may be used.

According to an embodiment, the video decoding apparatus 150 may select a coding unit at a predetermined location from among an odd number of coding units determined by splitting the current coding unit, considering the shape of the current coding unit. For example, when the current coding unit has a non-square shape, a width of which is longer than a height, the video decoding apparatus 150 may determine the coding unit at the predetermined location in a horizontal direction. That is, the video decoding apparatus 150 may determine one of coding units at different locations in a horizontal direction and put a restriction on the coding unit. When the current coding unit has a non-square shape, a height of which is longer than a width, the video decoding apparatus 150 may determine the coding unit at the predetermined location in a vertical direction. That is, the video decoding apparatus 150 may determine one of coding units at different locations in a vertical direction and may put a restriction on the coding unit.

According to an embodiment, the video decoding apparatus 150 may use information indicating respective locations of an even number of coding units, to determine the coding unit at the predetermined location from among the even number of coding units. The video decoding apparatus 150 may determine an even number of coding units by splitting the current coding unit, and may determine the coding unit at the predetermined location by using the information about the locations of the even number of coding units. An operation related thereto may correspond to the operation of determining a coding unit at a predetermined location (e.g., a center location) from among an odd number of coding units, which has been described in detail above in relation to FIG. 5, and thus detailed descriptions thereof are not provided here.

According to an embodiment, when a non-square current coding unit is split into a plurality of coding units, predetermined information about a coding unit at a predetermined location may be used in a splitting operation to determine the coding unit at the predetermined location from among the plurality of coding units. For example, the video decoding apparatus 150 may use at least one of block shape information and split shape information, which is stored in a sample included in a coding unit at a center location, in a splitting operation to determine the coding unit at the center location from among the plurality of coding units determined by splitting the current coding unit.

Referring to FIG. 5, the video decoding apparatus 150 may split the current coding unit 500 into a plurality of coding units 520a, 520b, and 520c based on at least one of the block shape information and the split shape information, and may determine a coding unit 520b at a center location from among the plurality of the coding units 520a, 520b, and 520c. Furthermore, the video decoding apparatus 150 may determine the coding unit 520b at the center location, in consideration of a location from which at least one of the block shape information and the split shape information is obtained. That is, at least one of the block shape information and the split shape information of the current coding unit 500 may be obtained from the sample 540 at a center location of the current coding unit 500 and, when the current coding unit 500 is split into the plurality of coding units 520a, 520b, and 520c based on at least one of the block shape information and the split shape information, the coding unit 520b including the sample 540 may be determined as the coding unit at the center location. However, information used to determine the coding unit at the center location is not limited to at least one of the block shape information and the split shape information, and various types of information may be used to determine the coding unit at the center location.

According to an embodiment, predetermined information for identifying the coding unit at the predetermined location may be obtained from a predetermined sample included in a coding unit to be determined. Referring to FIG. 5, the video decoding apparatus 150 may use at least one of the block shape information and the split shape information, which is obtained from a sample at a predetermined location in the current coding unit 500 (e.g., a sample at a center location of the current coding unit 500) to determine a coding unit at a predetermined location from among the plurality of the coding units 520a, 520b, and 520c determined by splitting the current coding unit 500 (e.g., a coding unit at a center location from among a plurality of split coding units). That is, the video decoding apparatus 150 may determine the sample at the predetermined location by considering a block shape of the current coding unit 500, determine the coding unit 520b including a sample, from which predetermined information (e.g., at least one of the block shape information and the split shape information) may be obtained, from among the plurality of coding units 520a, 520b, and 520c determined by splitting the current coding unit 500, and may put a predetermined restriction on the coding unit 520b. Referring to FIG. 5, according to an embodiment, the video decoding apparatus 150 may determine the sample 540 at the center location of the current coding unit 500 as the sample from which the predetermined information may be obtained, and may put a predetermined restriction on the coding unit 520b including the sample 540, in a decoding operation. However, the location of the sample from which the predetermined information may be obtained is not limited to the above-described location, and may include arbitrary locations of samples included in the coding unit 520b to be determined for a restriction.

According to an embodiment, the location of the sample from which the predetermined information may be obtained may be determined based on the shape of the current coding unit 500. According to an embodiment, the block shape information may indicate whether the current coding unit has a square or non-square shape, and the location of the sample from which the predetermined information may be obtained may be determined based on the shape. For example, the video decoding apparatus 150 may determine a sample located on a boundary for dividing at least one of a width and height of the current coding unit in half, as the sample from which the predetermined information may be obtained, by using at least one of information about the width of the current coding unit and information about the height of the current coding unit. As another example, when the block shape information of the current coding unit indicates a non-square shape, the video decoding apparatus 150 may determine one of samples adjacent to a boundary for dividing a long side of the current coding unit in half, as the sample from which the predetermined information may be obtained.

According to an embodiment, when the current coding unit is split into a plurality of coding units, the video decoding apparatus 150 may use at least one of the block shape information and the split shape information to determine a coding unit at a predetermined location from among the plurality of coding units. According to an embodiment, the video decoding apparatus 150 may obtain at least one of the block shape information and the split shape information from a sample at a predetermined location in a coding unit, and split the plurality of coding units, which are generated by splitting the current coding unit, by using at least one of the split shape information and the block shape information, which is obtained from the sample of the predetermined location in each of the plurality of coding units. That is, a coding unit may be recursively split based on at least one of the block shape information and the split shape information, which is obtained from the sample at the predetermined location in each coding unit. An operation of recursively splitting a coding unit has been described above in relation to FIG. 4, and thus detailed descriptions thereof will not be provided here.

According to an embodiment, the video decoding apparatus 150 may determine one or more coding units by splitting the current coding unit, and may determine an order of decoding the one or more coding units, based on a predetermined block (e.g., the current coding unit).

Figure 6:
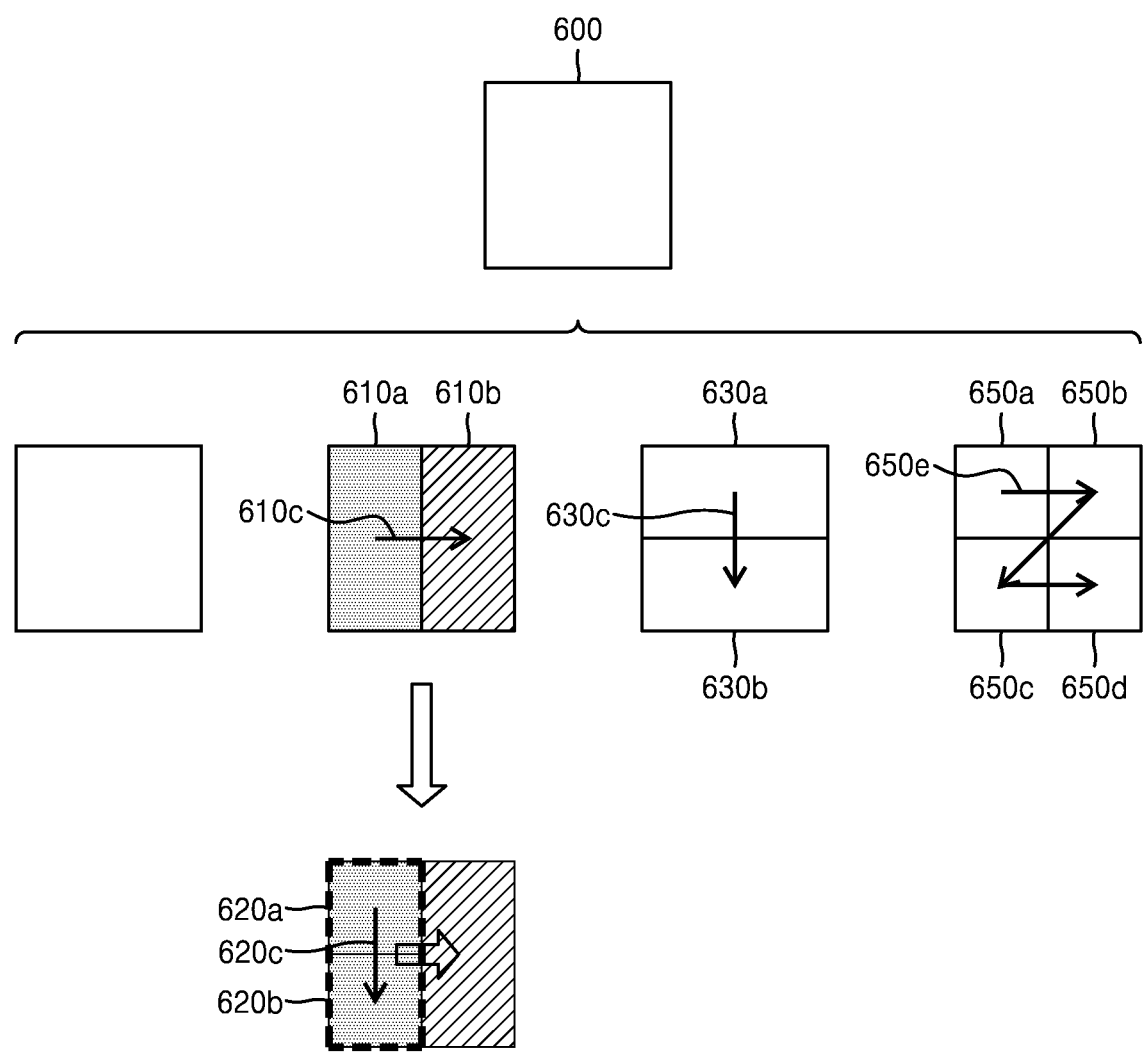
FIG. 6 illustrates an order of processing a plurality of coding units when the plurality of coding units are determined by splitting a current coding unit, according to an embodiment.

FIG. 6 illustrates an order of processing a plurality of coding units when the video decoding apparatus 150 determines the plurality of coding units by splitting a current coding unit, according to an embodiment.

According to an embodiment, the video decoding apparatus 150 may determine second coding units 610a and 610b by splitting a first coding unit 600 in a vertical direction, determine second coding units 630a and 630b by splitting the first coding unit 600 in a horizontal direction, or determine second coding units 650a to 650d by splitting the first coding unit 600 in vertical and horizontal directions, based on block shape information and split shape information.

Referring to FIG. 6, the video decoding apparatus 150 may determine to process the second coding units 610a and 610b, which are determined by splitting the first coding unit 600 in a vertical direction, in a horizontal direction order 610c. The video decoding apparatus 150 may determine to process the second coding units 630a and 630b, which are determined by splitting the first coding unit 600 in a horizontal direction, in a vertical direction order 630c. The video decoding apparatus 150 may determine to process the second coding units 650a to 650d, which are determined by splitting the first coding unit 600 in vertical and horizontal directions, in a predetermined order for processing coding units in a row and then processing coding units in a next row (e.g., in a raster scan order or Z-scan order 650e).

According to an embodiment, the video decoding apparatus 150 may recursively split coding units. Referring to FIG. 6, the video decoding apparatus 150 may determine a plurality of coding units 610a, 610b, 630a, 630b, 650a, 650b, 650c, and 650d by splitting the first coding unit 600, and may recursively split each of the determined plurality of coding units 610a, 610b, 630a, 630b, 650a, 650b, 650c, and 650d. A splitting method of the plurality of coding units 610a, 610b, 630a, 630b, 650a, 650b, 650c, and 650d may correspond to a splitting method of the first coding unit 600. As such, each of the plurality of coding units 610a, 610b, 630a, 630b, 650a, 650b, 650c, and 650d may be independently split into a plurality of coding units. Referring to FIG. 6, the video decoding apparatus 150 may determine the second coding units 610a and 610b by splitting the first coding unit 600 in a vertical direction, and may determine to independently split or not to split each of the second coding units 610a and 610b.

According to an embodiment, the video decoding apparatus 150 may determine third coding units 620a and 620b by splitting the left second coding unit 610a in a horizontal direction, and may not split the right second coding unit 610b.

According to an embodiment, a processing order of coding units may be determined based on an operation of splitting a coding unit. In other words, a processing order of split coding units may be determined based on a processing order of coding units immediately before being split. The video decoding apparatus 150 may determine a processing order of the third coding units 620a and 620b determined by splitting the left second coding unit 610a, independently of the right second coding unit 610b. Because the third coding units 620a and 620b are determined by splitting the left second coding unit 610a in a horizontal direction, the third coding units 620a and 620b may be processed in a vertical direction order 620c. Because the left and right second coding units 610a and 610b are processed in the horizontal direction order 610c, the right second coding unit 610b may be processed after the third coding units 620a and 620b included in the left second coding unit 610a are processed in the vertical direction order 620c. An operation of determining a processing order of coding units based on a coding unit before being split is not limited to the above-described example, and various methods may be used to independently process coding units, which are split and determined to various shapes, in a predetermined order.

Figure 7:
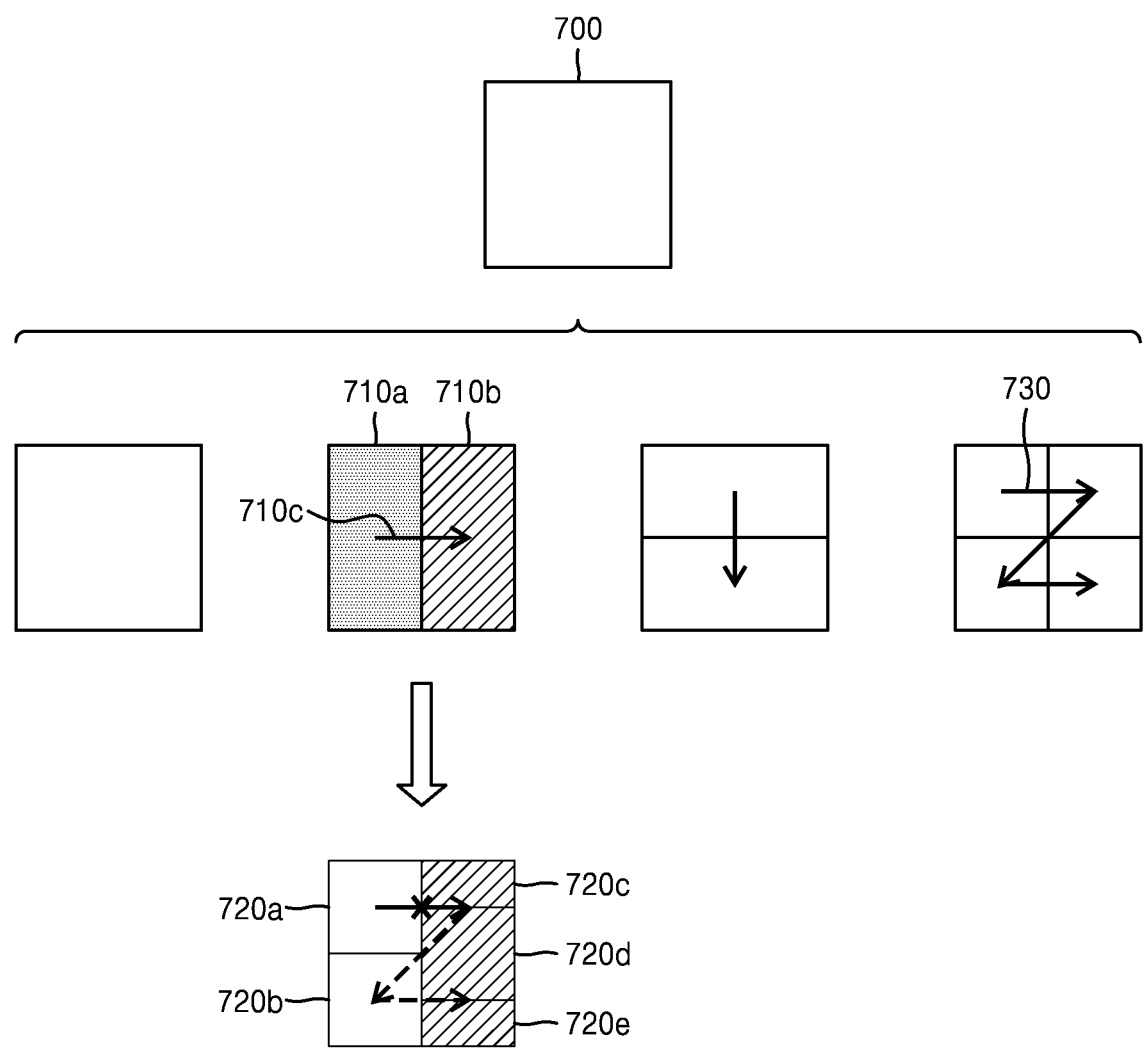
FIG. 7 illustrates a process of determining that a current coding unit is to be split into an odd number of coding units, when the coding units are not processable in a predetermined order, according to an embodiment.

FIG. 7 illustrates a process, performed by the video decoding apparatus 150, of determining that a current coding unit is to be split into an odd number of coding units, when the coding units are not processable in a predetermined order, according to an embodiment.

According to an embodiment, the video decoding apparatus 150 may determine whether the current coding unit is split into an odd number of coding units, based on obtained block shape information and split shape information. Referring to FIG. 7, a square first coding unit 700 may be split into non-square second coding units 710a and 710b, and the second coding units 710a and 710b may be independently split into third coding units 720a and 720b, and 720c to 720e. According to an embodiment, the video decoding apparatus 150 may determine a plurality of third coding units 720a and 720b by splitting the left second coding unit 710a in a horizontal direction, and may split the right second coding unit 710b into an odd number of third coding units 720c to 720e.

According to an embodiment, the video decoding apparatus 150 may determine whether any coding unit is split into an odd number of coding units, by determining whether the third coding units 720a and 720b, and 720c to 720e are processable in a predetermined order. Referring to FIG. 7, the video decoding apparatus 150 may determine the third coding units 720a and 720b, and 720c to 720e by recursively splitting the first coding unit 700. The video decoding apparatus 150 may determine whether any of the first coding unit 700, the second coding units 710a and 710b, and the third coding units 720a and 720b, and 720c, 720d, and 720e are split into an odd number of coding units, based on at least one of the block shape information and the split shape information. For example, the right second coding unit 710b may be split into an odd number of third coding units 720c, 720d, and 720e. A processing order of a plurality of coding units included in the first coding unit 700 may be a predetermined order (e.g., a Z-scan order 730), and the video decoding apparatus 150 may decide whether the third coding units 720c, 720d, and 720e, which are determined by splitting the right second coding unit 710b into an odd number of coding units, satisfy a condition for processing in the predetermined order.

According to an embodiment, the video decoding apparatus 150 may determine whether the third coding units 720a and 720b, and 720c, 720d, and 720e included in the first coding unit 700 satisfy the condition for processing in the predetermined order, and the condition relates to whether at least one of a width and height of the second coding units 710a and 710b is divided in half along a boundary of the third coding units 720a and 720b, and 720c, 720d, and 720e. For example, the third coding units 720a and 720b determined by dividing the height of the non-square left second coding unit 710a in half satisfy the condition. However, because boundaries of the third coding units 720c, 720d, and 720e determined by splitting the right second coding unit 710b into three coding units do not divide the width or height of the right second coding unit 710b in half, it may be determined that the third coding units 720c, 720d, and 720e do not satisfy the condition. When the condition is not satisfied as described above, the video decoding apparatus 70 may decide disconnection of a scan order, and determine that the right second coding unit 710b is split into an odd number of coding units, based on a result of the decision. According to an embodiment, when a coding unit is split into an odd number of coding units, the video decoding apparatus 150 may put a predetermined restriction on a coding unit at a predetermined location among the split coding units. The restriction or the predetermined location has been described above in relation to various embodiments, and thus detailed descriptions thereof will not be provided here.

Figure 8:
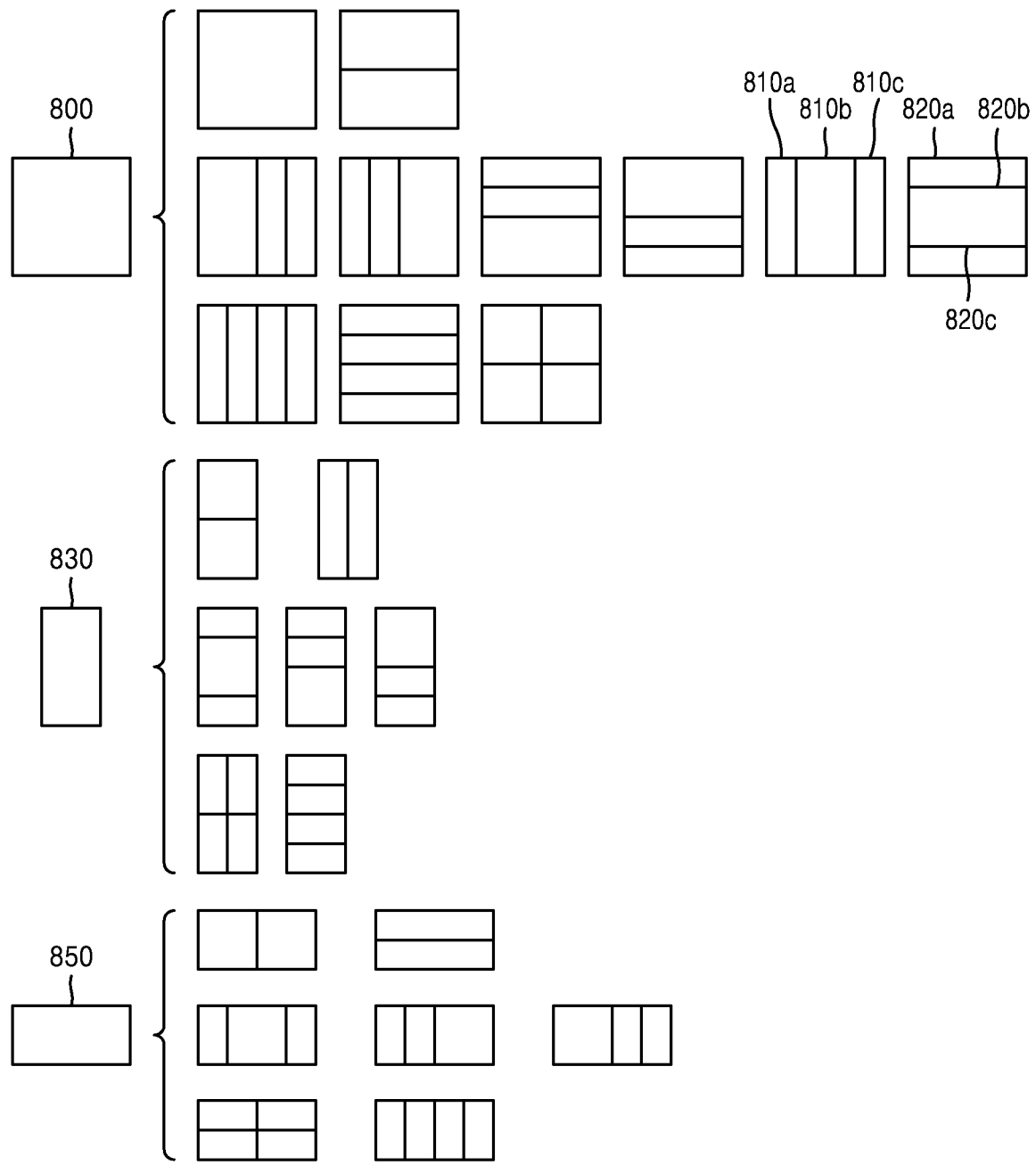
FIG. 8 illustrates a process of determining at least one coding unit by splitting a first coding unit, according to an embodiment.

FIG. 8 illustrates a process, performed by the video decoding apparatus 150, of determining at least one coding unit by splitting a first coding unit 800, according to an embodiment. According to an embodiment, the video decoding apparatus 150 may split the first coding unit 800, based on at least one of block shape information and split shape information, which is obtained by the receiver 160. The square first coding unit 800 may be split into four square coding units, or may be split into a plurality of non-square coding units. For example, referring to FIG. 8, when the block shape information indicates that the first coding unit 800 has a square shape and the split shape information indicates to split the first coding unit 800 into non-square coding units, the video decoding apparatus 150 may split the first coding unit 800 into a plurality of non-square coding units. In detail, when the split shape information indicates to determine an odd number of coding units by splitting the first coding unit 800 in a horizontal direction or a vertical direction, the video decoding apparatus 150 may split the square first coding unit 800 into an odd number of coding units, e.g., second coding units 810a, 810b, and 810c determined by splitting the square first coding unit 800 in a vertical direction or second coding units 820a, 820b, and 820c determined by splitting the square first coding unit 800 in a horizontal direction.

According to an embodiment, the video decoding apparatus 150 may determine whether the second coding units 810a, 810b, 810c, 820a, 820b, and 820c included in the first coding unit 800 satisfy a condition for processing in a predetermined order, and the condition relates to whether at least one of a width and height of the first coding unit 800 is divided in half along a boundary of the second coding units 810a, 810b, 810c, 820a, 820b, and 820c. Referring to FIG. 8, because boundaries of the second coding units 810a, 810b, and 810c determined by splitting the square first coding unit 800 in a vertical direction do not divide the height of the first coding unit 800 in half, it may be determined that the first coding unit 800 does not satisfy the condition for processing in the predetermined order. In addition, because boundaries of the second coding units 820a, 820b, and 820c determined by splitting the square first coding unit 800 in a horizontal direction do not divide the width of the first coding unit 800 in half, it may be determined that the first coding unit 800 does not satisfy the condition for processing in the predetermined order. When the condition is not satisfied as described above, the video decoding apparatus 150 may decide disconnection of a scan order, and may determine that the first coding unit 800 is split into an odd number of coding units, based on a result of the decision. According to an embodiment, when a coding unit is split into an odd number of coding units, the video decoding apparatus 150 may put a predetermined restriction on a coding unit at a predetermined location from among the split coding units. The restriction or the predetermined location has been described above in relation to various embodiments, and thus detailed descriptions thereof will not be provided herein.

According to an embodiment, the video decoding apparatus 150 may determine various-shaped coding units by splitting a first coding unit.

Referring to FIG. 8, the video decoding apparatus 150 may split the square first coding unit 800 or a non-square first coding unit 830 or 850 into various-shaped coding units.

Figure 9:
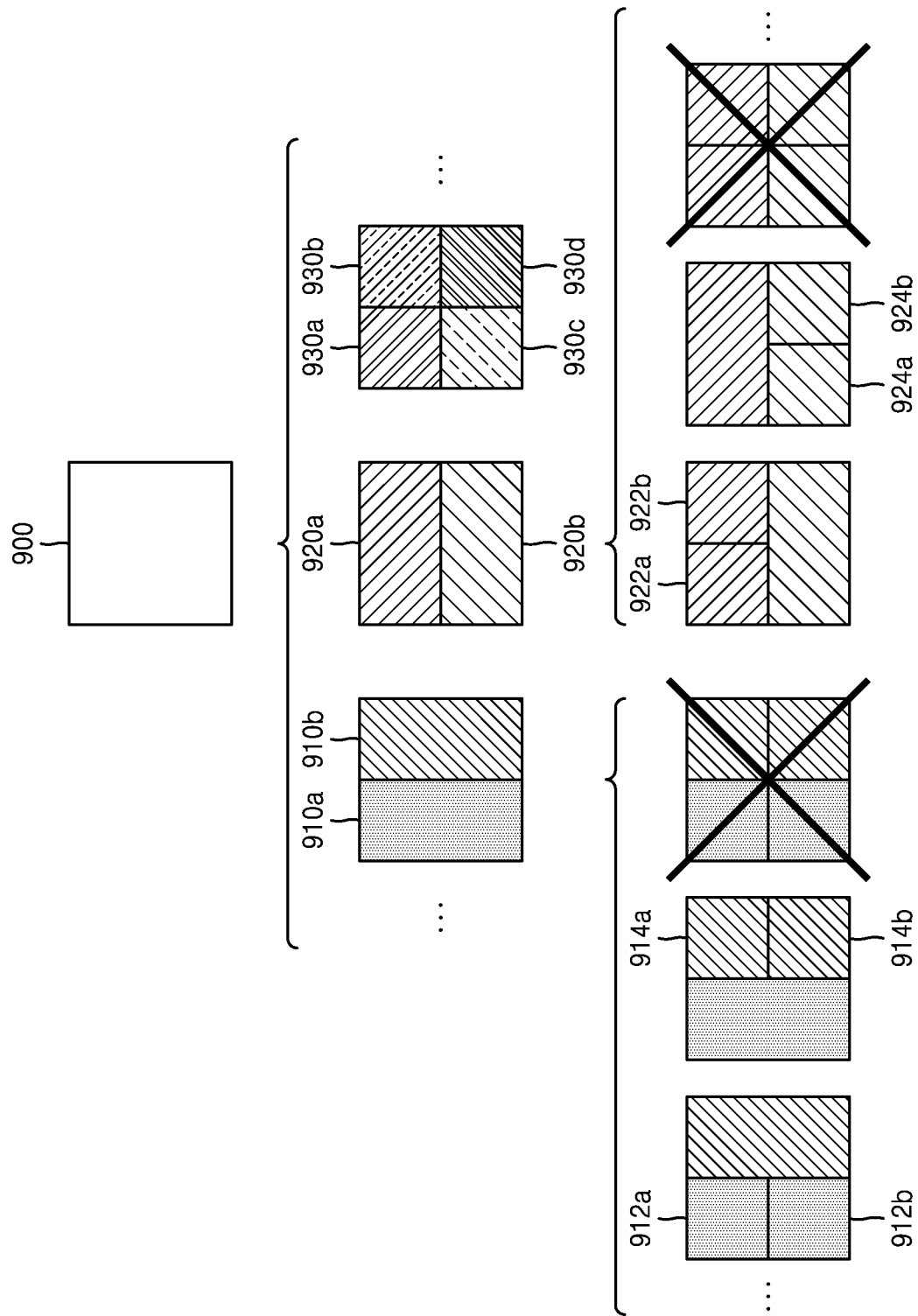
FIG. 9 illustrates that a shape into which a second coding unit is splittable is restricted when the second coding unit having a non-square shape, which is determined by splitting a first coding unit, satisfies a predetermined condition, according to an embodiment.

FIG. 9 illustrates that a shape into which a second coding unit is splittable by the video decoding apparatus 150 is restricted when the second coding unit having a non-square shape, which is determined by splitting a first coding unit 900, satisfies a predetermined condition, according to an embodiment.

According to an embodiment, the video decoding apparatus 150 may determine to split the square first coding unit 900 into non-square second coding units 910a, 910b, 920a, and 920b, based on at least one of block shape information and split shape information, which is obtained by the receiver 160. The second coding units 910a, 910b, 920a, and 920b may be independently split. As such, the video decoding apparatus 150 may determine to split or not to split the first coding unit 900 into a plurality of coding units, based on at least one of the block shape information and the split shape information of each of the second coding units 910a, 910b, 920a, and 920b. According to an embodiment, the video decoding apparatus 150 may determine third coding units 912a and 912b by splitting the non-square left second coding unit 910a, which is determined by splitting the first coding unit 900 in a vertical direction, in a horizontal direction. However, when the left second coding unit 910a is split in a horizontal direction, the video decoding apparatus 150 may restrict the right second coding unit 910b to not be split in a horizontal direction in which the left second coding unit 910a is split. When third coding units 914a and 914b are determined by splitting the right second coding unit 910b in a same direction, because the left and right second coding units 910a and 910b are independently split in a horizontal direction, the third coding units 912a, 912b, 914a, and 914b may be determined. However, this case serves equally as a case in which the video decoding apparatus 150 splits the first coding unit 900 into four square second coding units 930a, 930b, 930c, and 930d, based on at least one of the block shape information and the split shape information, and may be inefficient in terms of image decoding.

According to an embodiment, the video decoding apparatus 150 may determine third coding units 922a, 922b, 924a, and 924b by splitting the non-square second coding unit 920a or 920b, which is determined by splitting the first coding unit 900 in a horizontal direction, in a vertical direction. However, when a second coding unit (e.g., the upper second coding unit 920a) is split in a vertical direction, for the above-described reason, the video decoding apparatus 150 may restrict the other second coding unit (e.g., the lower second coding unit 920b) to not be split in a vertical direction in which the upper second coding unit 920a is split.

Figure 10:
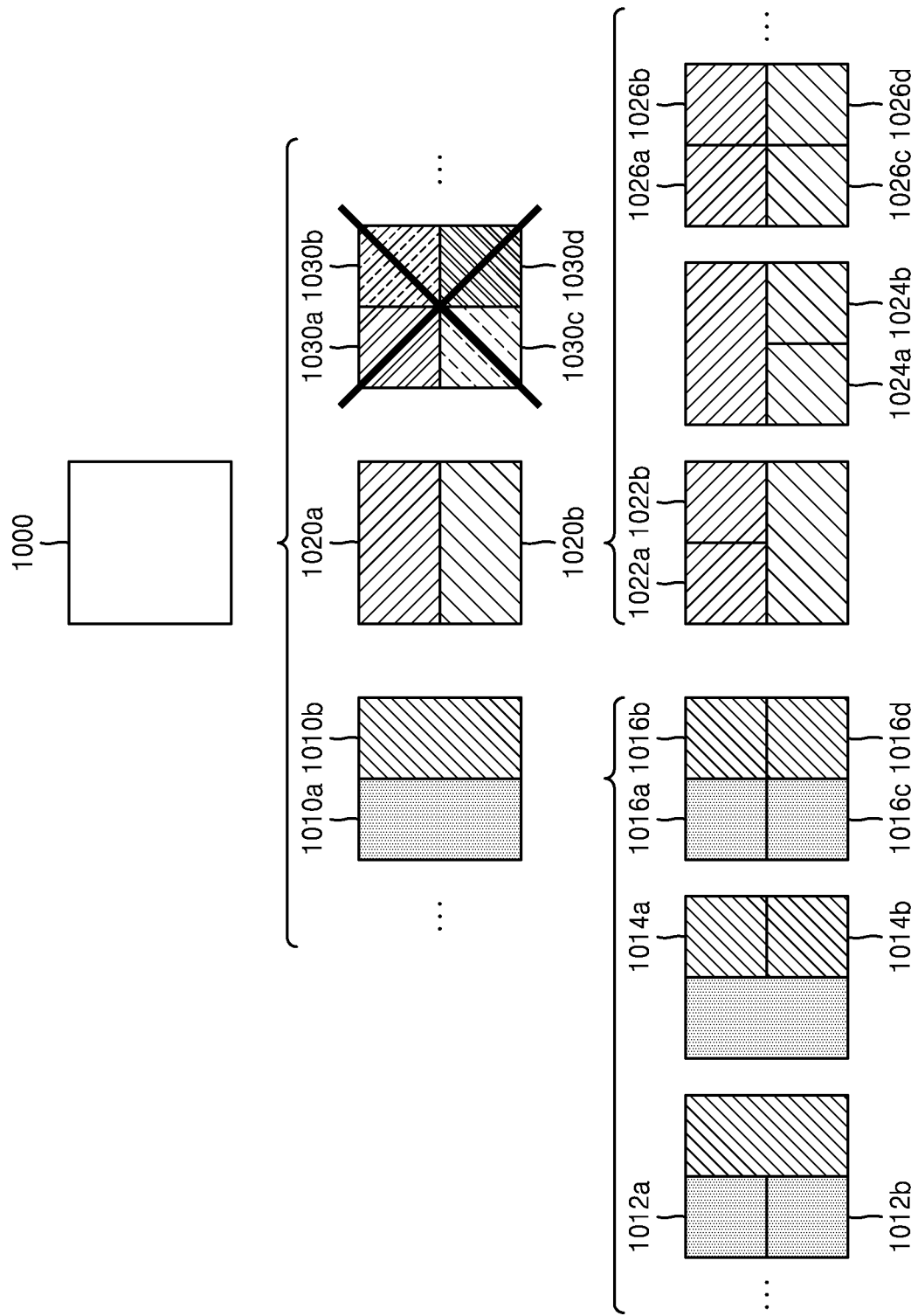
FIG. 10 illustrates a process of splitting a square coding unit when split shape information indicates that the square coding unit is not to be split into four square coding units, according to an embodiment.

FIG. 10 illustrates a process, performed by the video decoding apparatus 150, of splitting a square coding unit when split shape information indicates that the square coding unit is not to be split into four square coding units, according to an embodiment.

According to an embodiment, the video decoding apparatus 150 may determine second coding units 1010a, 1010b, 1020a, 1020b, etc. by splitting a first coding unit 1000, based on at least one of block shape information and split shape information. The split shape information may include information about various methods of splitting a coding unit but, the information about various splitting methods may not include information for splitting a coding unit into four square coding units. According to such split shape information, the video decoding apparatus 150 may not split the first square coding unit 1000 into four square second coding units 1030a, 1030b, 1030c, and 1030d. The video decoding apparatus 150 may determine the non-square second coding units 1010a, 1010b, 1020a, 1020b, etc., based on the split shape information.

According to an embodiment, the video decoding apparatus 150 may independently split the non-square second coding units 1010a, 1010b, 1020a, 1020b, etc. Each of the second coding units 1010a, 1010b, 1020a, 1020b, etc. may be recursively split in a predetermined order, and this splitting method may correspond to a method of splitting the first coding unit 1000, based on at least one of the block shape information and the split shape information.

For example, the video decoding apparatus 150 may determine square third coding units 1012a and 1012b by splitting the left second coding unit 1010a in a horizontal direction, and may determine square third coding units 1014a and 1014b by splitting the right second coding unit 1010b in a horizontal direction. Furthermore, the video decoding apparatus 150 may determine square third coding units 1016a, 1016b, 1016c, and 1016d by splitting both of the left and right second coding units 1010a and 1010b in a horizontal direction. In this case, coding units having the same shape as the four square second coding units 1030a, 1030b, 1030c, and 1030d split from the first coding unit 1000 may be determined.

As another example, the video decoding apparatus 150 may determine square third coding units 1022a and 1022b by splitting the upper second coding unit 1020a in a vertical direction, and may determine square third coding units 1024a and 1024b by splitting the lower second coding unit 1020b in a vertical direction. Furthermore, the video decoding apparatus 150 may determine square third coding units 1026a, 1026b, 1026c, and 1026d by splitting both of the upper and lower second coding units 1020a and 1020b in a vertical direction. In this case, coding units having the same shape as the four square second coding units 1030a, 1030b, 1030c, and 1030d split from the first coding unit 1000 may be determined.

Figure 11:
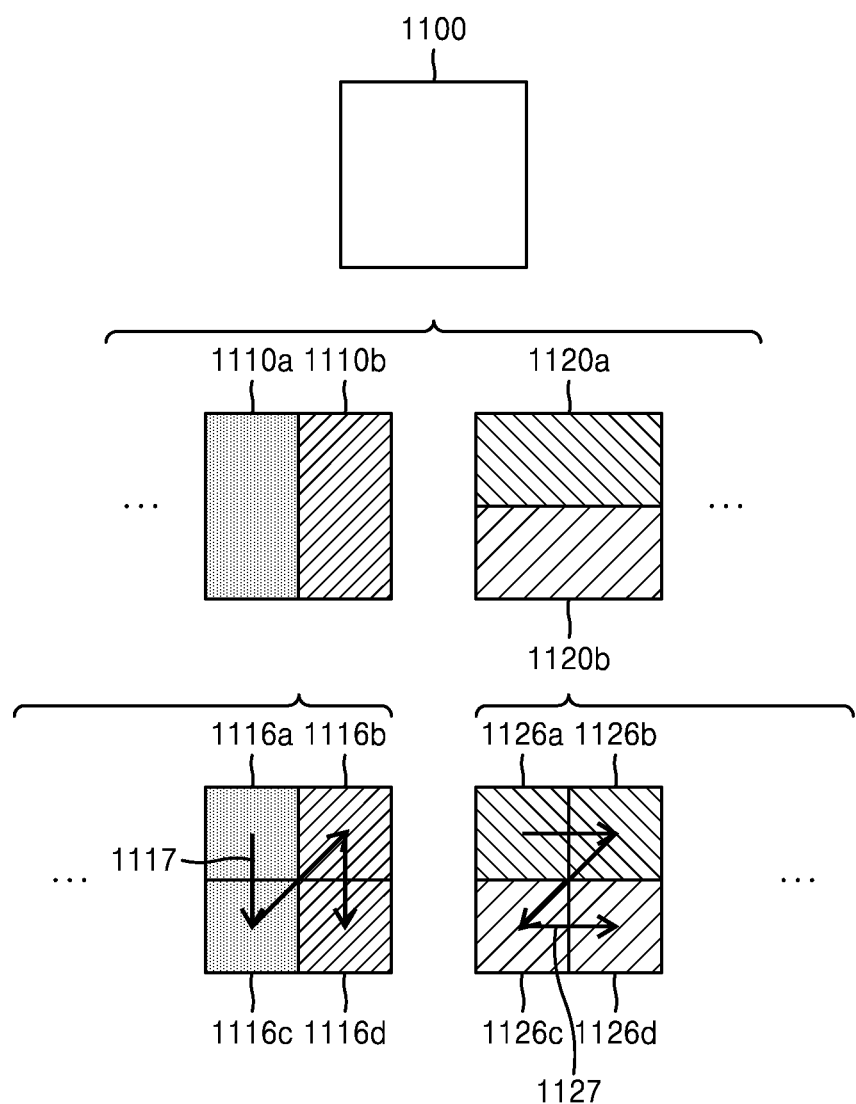
FIG. 11 illustrates that a processing order between a plurality of coding units may be changed depending on a process of splitting a coding unit, according to an embodiment.

FIG. 11 illustrates that a processing order between a plurality of coding units may be changed depending on a process of splitting a coding unit, according to an embodiment.

According to an embodiment, the video decoding apparatus 150 may split a first coding unit 1100, based on block shape information and split shape information. When the block shape information indicates a square shape and the split shape information indicates to split the first coding unit 1100 in at least one of horizontal and vertical directions, the video decoding apparatus 150 may determine second coding units 1110a, 1110b, 1120a, 1120b, by splitting the first coding unit 1100. Referring to FIG. 11, the non-square second coding units 1110a, 1110b, 1120a, and 1120b determined by splitting the first coding unit 1100 in only a horizontal direction or vertical direction may be independently split based on the block shape information and the split shape information of each coding unit. For example, the video decoding apparatus 150 may determine third coding units 1116a, 1116b, 1116c, and 1116d by splitting the second coding units 1110a and 1110b, which are generated by splitting the first coding unit 1100 in a vertical direction, in a horizontal direction, and may determine third coding units 1126a, 1126b, 1126c, and 1126d by splitting the second coding units 1120a and 1120b, which are generated by splitting the first coding unit 1100 in a horizontal direction, in a vertical direction. An operation of splitting the second coding units 1110a, 1110b, 1120a, and 1120b has been described above in relation to FIG. 9, and thus detailed descriptions thereof will not be provided herein.

According to an embodiment, the video decoding apparatus 150 may process coding units in a predetermined order. An operation of processing coding units in a predetermined order has been described above in relation to FIG. 6, and thus detailed descriptions thereof will not be provided herein. Referring to FIG. 11, the video decoding apparatus 150 may determine four square third coding units 1116a, 1116b, 1116c, and 1116d, and 1126a, 1126b, 1126c, and 1126d by splitting the square first coding unit 1100. According to an embodiment, the video decoding apparatus 150 may determine processing orders of the third coding units 1116a, 1116b, 1116c, and 1116d, and 1126a, 1126b, 1126c, and 1126d based on a splitting method of the first coding unit 1100.

According to an embodiment, the video decoding apparatus 150 may determine the third coding units 1116a, 1116b, 1116c, and 1116d by splitting the second coding units 1110a and 1110b generated by splitting the first coding unit 1100 in a vertical direction, in a horizontal direction, and may process the third coding units 1116a, 1116b, 1116c, and 1116d in a processing order 1117 for initially processing the third coding units 1116a and 1116c, which are included in the left second coding unit 1110a, in a vertical direction and then processing the third coding unit 1116b and 1116d, which are included in the right second coding unit 1110b, in a vertical direction.

According to an embodiment, the video decoding apparatus 150 may determine the third coding units 1126a, 1126b, 1126c, and 1126d by splitting the second coding units 1120a and 1120b generated by splitting the first coding unit 1100 in a horizontal direction, in a vertical direction, and may process the third coding units 1126a, 1126b, 1126c, and 1126d in a processing order 1127 for initially processing the third coding units 1126a and 1126b, which are included in the upper second coding unit 1120a, in a horizontal direction and then processing the third coding unit 1126c and 1126d, which are included in the lower second coding unit 1120b, in a horizontal direction.

Referring to FIG. 11, the square third coding units 1116a, 1116b, 1116c, and 1116d, and 1126a, 1126b, 1126c, and 1126d may be determined by splitting the second coding units 1110a, 1110b, 1120a, and 1120b, respectively. Although the second coding units 1110a and 1110b are determined by splitting the first coding unit 1100 in a vertical direction differently from the second coding units 1120a and 1120b which are determined by splitting the first coding unit 1100 in a horizontal direction, the third coding units 1116a, 1116b, 1116c, and 1116d, and 1126a, 1126b, 1126c, and 1126d split therefrom eventually show same-shaped coding units split from the first coding unit 1100. As such, by recursively splitting a coding unit in different manners based on at least one of the block shape information and the split shape information, the video decoding apparatus 150 may process a plurality of coding units in different orders even when the coding units are eventually determined to be the same shape.

FIG. 12 illustrates a process of determining a depth of a coding unit as a shape and size of the coding unit change, when the coding unit is recursively split such that a plurality of coding units are determined, according to an embodiment.

According to an embodiment, the video decoding apparatus 150 may determine the depth of the coding unit, based on a predetermined criterion. For example, the predetermined criterion may be the length of a long side of the coding unit. When the length of a long side of a coding unit before being split is 2n times (n>0) the length of a long side of a split current coding unit, the video decoding apparatus 150 may determine that a depth of the current coding unit is increased from a depth of the coding unit before being split, by n. In the following description, a coding unit having an increased depth is expressed as a coding unit of a deeper depth.

Referring to FIG. 12, according to an embodiment, the video decoding apparatus 150 may determine a second coding unit 1202 and a third coding unit 1204 of deeper depths by splitting a square first coding unit 1200 based on block shape information indicating a square shape (for example, the block shape information may be expressed as '0: SQUARE'). Assuming that the size of the square first coding unit 1200 is 2N×2N, the second coding unit 1202 determined by dividing a width and height of the first coding unit 1200 to ½ may have a size of N×N. Furthermore, the third coding unit 1204 determined by dividing a width and height of the second coding unit 1202 to ½ may have a size of N/2×N/2. In this case, a width and height of the third coding unit 1204 are ¼ times those of the first coding unit 1200. When a depth of the first coding unit 1200 is D, a depth of the second coding unit 1202, the width and height of which are ½ times those of the first coding unit 1200, may be D+1, and a depth of the third coding unit 1204, the width and height of which are ¼ times those of the first coding unit 1200, may be D+2.

According to an embodiment, the video decoding apparatus 150 may determine a second coding unit 1212 or 1222 and a third coding unit 1214 or 1224 of deeper depths by splitting a non-square first coding unit 1210 or 1220 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The video decoding apparatus 150 may determine a second coding unit 1202, 1212, or 1222 by dividing at least one of a width and height of the first coding unit 1210 having a size of N×2N. That is, the video decoding apparatus 150 may determine the second coding unit 1202 having a size of N×N or the second coding unit 1222 having a size of N×N/2 by splitting the first coding unit 1210 in a horizontal direction, or may determine the second coding unit 1212 having a size of N/2×N by splitting the first coding unit 1210 in horizontal and vertical directions.

According to an embodiment, the video decoding apparatus 150 may determine the second coding unit 1202, 1212, or 1222 by dividing at least one of a width and height of the first coding unit 1220 having a size of 2N×N. That is, the video decoding apparatus 150 may determine the second coding unit 1202 having a size of N×N or the second coding unit 1212 having a size of N/2×N by splitting the first coding unit 1220 in a vertical direction, or may determine the second coding unit 1222 having a size of N×N/2 by splitting the first coding unit 1220 in horizontal and vertical directions.

According to an embodiment, the video decoding apparatus 150 may determine a third coding unit 1204, 1214, or 1224 by dividing at least one of a width and height of the second coding unit 1202 having a size of N×N. That is, the video decoding apparatus 150 may determine the third coding unit 1204 having a size of N/2×N/2, the third coding unit 1214 having a size of N/2×N/2, or the third coding unit 1224 having a size of N/2×N/2 by splitting the second coding unit 1202 in vertical and horizontal directions.

According to an embodiment, the video decoding apparatus 150 may determine the third coding unit 1204, 1214, or 1224 by dividing at least one of a width and height of the second coding unit 1212 having a size of N/2×N. That is, the video decoding apparatus 150 may determine the third coding unit 1204 having a size of N/2×N/2 or the third coding unit 1224 having a size of N/2×N/2 by splitting the second coding unit 1212 in a horizontal direction, or may determine the third coding unit 1214 having a size of N/2×N/2 by splitting the second coding unit 1212 in vertical and horizontal directions.

According to an embodiment, the video decoding apparatus 150 may determine a third coding unit (e.g., the third coding unit 1204, 1214, or 1224) by dividing at least one of a width and height of the second coding unit 1212 having a size of N×N/2. That is, the video decoding apparatus 150 may determine the third coding unit 1204 having a size of N/2×N/2 or the third coding unit 1214 having a size of N/2×N/2 by splitting the second coding unit 1212 in a vertical direction, or may determine the third coding unit 1224 having a size of N/2×N/2 by splitting the second coding unit 1212 in vertical and horizontal directions.

According to an embodiment, the video decoding apparatus 150 may split the square coding unit 1200, 1202, or 1204 in a horizontal or vertical direction. For example, the video decoding apparatus 150 may determine the first coding unit 1210 having a size of N×2N by splitting the first coding unit 1200 having a size of 2N×2N in a vertical direction, or may determine the first coding unit 1220 having a size of 2N×N by splitting the first coding unit 1200 in a horizontal direction. According to an embodiment, when a depth is determined based on the length of the longest side of a coding unit, a depth of a coding unit determined by splitting the first coding unit 1200, 1202 or 1204 having a size of 2N×2N in a horizontal or vertical direction may be the same as the depth of the first coding unit 1200, 1202 or 1204.

According to an embodiment, a width and height of the third coding unit 1214 or 1224 may be ½ times those of the first coding unit 1210 or 1220. When a depth of the first coding unit 1210 or 1220 is D, a depth of the second coding unit 2012 or 1212, the width and height of which are ½ times those of the first coding unit 1210 or 1220, may be D+1, and a depth of the third coding unit 1214 or 1224, the width and height of which are ½ times those of the first coding unit 2010 or 2020, may be D+2.

FIG. 13 illustrates depths that are determinable based on shapes and sizes of coding units, and part indexes (PIDs) that are for distinguishing the coding units, according to an embodiment.

According to an embodiment, the video decoding apparatus 150 may determine various-shape second coding units by splitting a square first coding unit 1300. Referring to FIG. 13, the video decoding apparatus 150 may determine second coding units 1302a and 1302b, 1304a and 1304b, and 1306a, 1306b, 1306c, and 1306d by splitting the first coding unit 1300 in at least one of vertical and horizontal directions based on split shape information. That is, the video decoding apparatus 150 may determine the second coding units 1302a and 1302b, 1304a and 1304b, and 1306a, 1306b, 1306c, and 1306d, based on the split shape information of the first coding unit 1300.

According to an embodiment, a depth of the second coding units 1302a and 1302b, 1304a and 1304b, and 1306a, 1306b, 1306c, and 1306d, which are determined based on the split shape information of the square first coding unit 1300, may be determined based on the length of a long side thereof. For example, because the length of a side of the square first coding unit 1300 equals the length of a long side of the non-square second coding units 1302a and 1302b, and 1304a and 1304b, the first coding unit 1300 and the non-square second coding units 1302a and 1302b, and 1304a and 1304b may have the same depth, e.g., D. However, when the video decoding apparatus 150 splits the first coding unit 1300 into the four square second coding units 1306a, 1306b, 1306c, and 1306d based on the split shape information, because the length of a side of the square second coding units 1306a, 1306b, 1306c, and 1306d is ½ times the length of a side of the first coding unit 1300, a depth of the second coding units 1306a, 1306b, 1306c, and 1306d may be D+1 which is deeper than the depth D of the first coding unit 1300 by 1.

According to an embodiment, the video decoding apparatus 150 may determine a plurality of second coding units 1312a and 1312b, and 1314a, 1314b, and 1314c by splitting a first coding unit 1310, a height of which is longer than a width, in a horizontal direction based on the split shape information. According to an embodiment, the video decoding apparatus 150 may determine a plurality of second coding units 1322a and 1322b, and 1324a, 1324b, and 1324c by splitting a first coding unit 1320, a width of which is longer than a height, in a vertical direction based on the split shape information.

According to an embodiment, a depth of the second coding units 1312a and 1312b, 1314a, 1314b, and 1314c, 1322a and 1322b, and 1324a, 1324b, and 1324c, which are determined based on the split shape information of the non-square first coding unit 1310 or 1320, may be determined based on the length of a long side thereof. For example, because the length of a side of the square second coding units 1312a and 1312b is ½ times the length of a long side of the first coding unit 1310 having a non-square shape, a height of which is longer than a width, a depth of the square second coding units 1312a and 1312b is D+1 which is deeper than the depth D of the non-square first coding unit 1310 by 1.

Furthermore, the video decoding apparatus 150 may split the non-square first coding unit 1310 into an odd number of second coding units 1314a, 1314b, and 1314c based on the split shape information. The odd number of second coding units 1314a, 1314b, and 1314c may include the non-square second coding units 1314a and 1314c and the square second coding unit 1314b. In this case, because the length of a long side of the non-square second coding units 1314a and 1314c and the length of a side of the square second coding unit 1314b are ½ times the length of a long side of the first coding unit 1310, a depth of the second coding units 1314a, 1314b, and 1314c may be D+1 which is deeper than the depth D of the non-square first coding unit 1310 by 1. The video decoding apparatus 150 may determine depths of coding units split from the first coding unit 1320 having a non-square shape, a width of which is longer than a height, by using the above-described method of determining depths of coding units split from the first coding unit 1310.

According to an embodiment, the video decoding apparatus 150 may determine PIDs for identifying split coding units, based on a size ratio between the coding units when an odd number of split coding units do not have equal sizes. Referring to FIG. 13, a coding unit 1314b of a center location among an odd number of split coding units 1314a, 1314b, and 1314c may have a width equal to that of the other coding units 1314a and 1314c and a height which is two times that of the other coding units 1314a and 1314c. That is, in this case, the coding unit 1314b at the center location may include two of the other coding unit 1314a or 1314c. Therefore, when a PID of the coding unit 1314b at the center location is 1 based on a scan order, a PID of the coding unit 1314c located next to the coding unit 1314b may be increased by 2 and thus may be 3. That is, discontinuity in PID values may be present. According to an embodiment, the video decoding apparatus 150 may determine whether an odd number of split coding units do not have equal sizes, based on whether discontinuity is present in PIDs for identifying the split coding units.

According to an embodiment, the video decoding apparatus 150 may determine whether to use a specific splitting method, based on PID values for identifying a plurality of coding units determined by splitting a current coding unit. Referring to FIG. 13, the video decoding apparatus 150 may determine an even number of coding units 1312*a* and 1312*b* or an odd number of coding units 1314*a*, 1314*b*, and 1314*c* by splitting the first coding unit 1310 having a rectangular shape, a height of which is longer than a width. The video decoding apparatus 150 may use PIDs to identify respective coding units. According to an embodiment, the PID may be obtained from a sample of a predetermined location of each coding unit (e.g., a top left sample).

According to an embodiment, the video decoding apparatus 150 may determine a coding unit at a predetermined location from among the split coding units, by using the PIDs for distinguishing the coding units. According to an embodiment, when the split shape information of the first coding unit 1310 having a rectangular shape, a height of which is longer than a width, indicates to split a coding unit into three coding units, the video decoding apparatus 150 may split the first coding unit 1310 into three coding units 1314*a*, 1314*b*, and 1314*c*. The video decoding apparatus 150 may assign a PID to each of the three coding units 1314*a*, 1314*b*, and 1314*c*. The video decoding apparatus 150 may compare PIDs of an odd number of split coding units to determine a coding unit at a center location from among the coding units. The video decoding apparatus 150 may determine the coding unit 1314*b* having a PID corresponding to a middle value among the PIDs of the coding units, as the coding unit at the center location from among the coding units determined by splitting the first coding unit 1310. According to an embodiment, the video decoding apparatus 150 may determine PIDs for distinguishing split coding units, based on a size ratio between the coding units when the split coding units do not have equal sizes. Referring to FIG. 13, the coding unit 1314*b* generated by splitting the first coding unit 1310 may have a width equal to that of the other coding units 1314*a* and 1314*c* and a height which is two times that of the other coding units 1314*a* and 1314*c*. In this case, when the PID of the coding unit 1314*b* at the center location is 1, the PID of the coding unit 1314*c* located next to the coding unit 1314*b* may be increased by 2 and thus may be 3. When the PID is not uniformly increased as described above, the video decoding apparatus 150 may determine that a coding unit is split into a plurality of coding units including a coding unit having a size different from that of the other coding units. According to an embodiment, when the split shape information indicates to split a coding unit into an odd number of coding units, the video decoding apparatus 150 may split a current coding unit in such a manner that a coding unit of a predetermined location among an odd number of coding units (e.g., a coding unit of a centre location) has a size different from that of the other coding units. In this case, the video decoding apparatus 150 may determine the coding unit of the centre location, which has a different size, by using PIDs of the coding units. However, the PIDs and the size or location of the coding unit of the predetermined location are not limited to the above-described examples, and various PIDs and various locations and sizes of coding units may be used.

According to an embodiment, the video decoding apparatus 150 may use a predetermined data unit where a coding unit starts to be recursively split.

Figure 14:
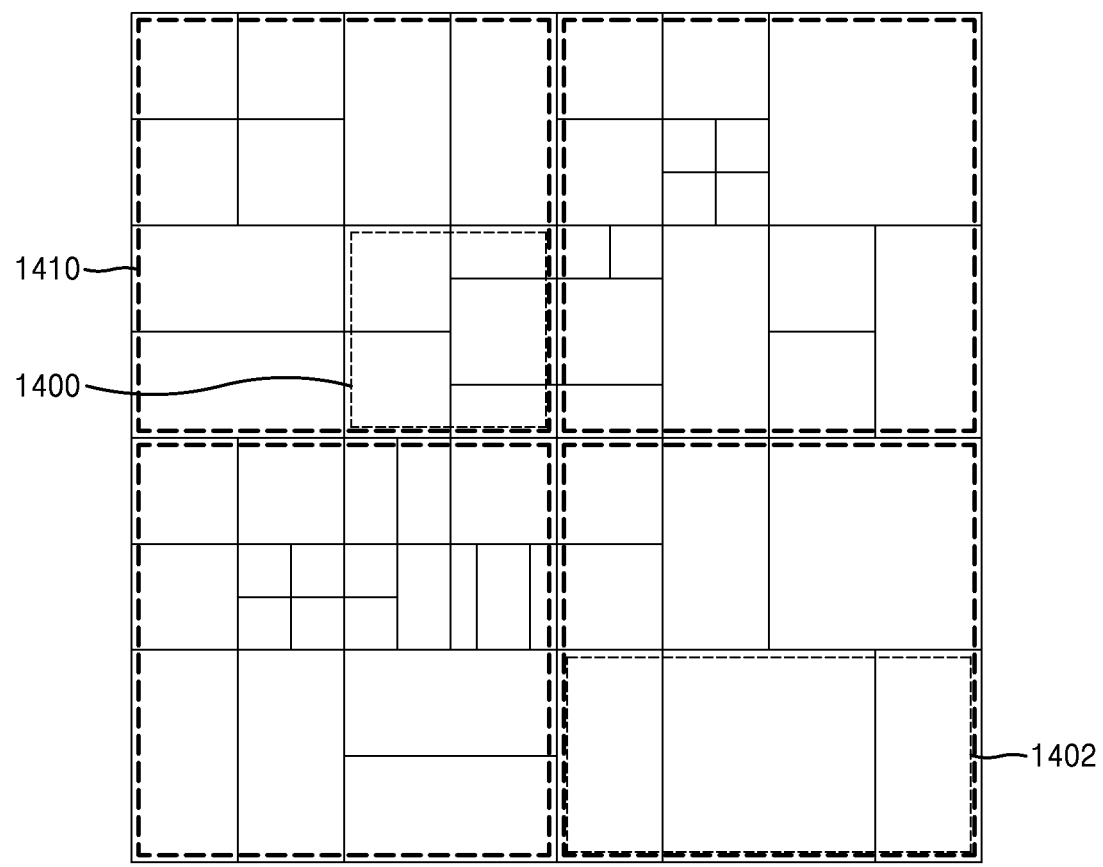
FIG. 14 illustrates that a plurality of coding units are determined based on a plurality of predetermined data units included in a picture, according to an embodiment.

FIG. 14 illustrates that a plurality of coding units are determined based on a plurality of predetermined data units included in a picture, according to an embodiment.

According to an embodiment, a predetermined data unit may be defined as a data unit where a coding unit starts to be recursively split by using at least one of block shape information and split shape information. That is, the predetermined data unit may correspond to a coding unit of an uppermost depth, which is used to determine a plurality of coding units split from a current picture. In the following descriptions, for convenience of explanation, the predetermined data unit is referred to as a reference data unit.

According to an embodiment, the reference data unit may have a predetermined size and a predetermined size shape. According to an embodiment, the reference data unit may include M×N samples. Herein, M and N may be equal to each other, and may be integers expressed as powers of 2. That is, the reference data unit may have a square or non-square shape, and may be split into an integer number of coding units.

According to an embodiment, the video decoding apparatus 150 may split the current picture into a plurality of reference data units. According to an embodiment, the video decoding apparatus 150 may split the plurality of reference data units, which are split from the current picture, by using splitting information about each reference data unit. The operation of splitting the reference data unit may correspond to a splitting operation using a quadtree structure.

According to an embodiment, the video decoding apparatus 150 may previously determine the minimum size allowed for the reference data units included in the current picture. Accordingly, the video decoding apparatus 150 may determine various reference data units having sizes equal to or greater than the minimum size, and may determine one or more coding units by using the block shape information and the split shape information with reference to the determined reference data unit.

Referring to FIG. 14, the video decoding apparatus 150 may use a square reference coding unit 1400 or a non-square reference coding unit 1402. According to an embodiment, the shape and size of reference coding units may be determined based on various data units capable of including one or more reference coding units (e.g., sequences, pictures, slices, slice segments, largest coding units, or the like).

According to an embodiment, the receiver 160 of the video decoding apparatus 150 may obtain, from a bitstream, at least one of reference coding unit shape information and reference coding unit size information with respect to each of the various data units. An operation of splitting the square reference coding unit 1400 into one or more coding units has been described above in relation to the operation of splitting the current coding unit 1100 of FIG. 11, and an operation of splitting the non-square reference coding unit 1400 into one or more coding units has been described above in relation to the operation of splitting the current coding unit 1100 or 1150 of FIG. 11. Thus, detailed descriptions thereof will not be provided herein.

According to an embodiment, the video decoding apparatus 150 may use a PID for identifying the size and shape of reference coding units, to determine the size and shape of reference coding units according to some data units previously determined based on a predetermined condition. That is, the receiver 160 may obtain, from the bitstream, only the PID for identifying the size and shape of reference coding units with respect to each slice, slice segment, or largest coding unit which is a data unit satisfying a predetermined condition (e.g., a data unit having a size equal to or smaller than a slice) among the various data units (e.g., sequences, pictures, slices, slice segments, largest coding units, or the like). The video decoding apparatus 150 may determine the size and shape of reference data units with respect to each data unit, which satisfies the predetermined condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the video decoding apparatus 150 may determine at least one of the size and shape of reference coding units included in a data unit serving as a unit for obtaining the PID, by selecting the previously determined at least one of the size and shape of reference coding units based on the PID.

According to an embodiment, the video decoding apparatus 150 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the video decoding apparatus 150 may determine the reference coding units by splitting the largest coding unit n times based on a quadtree structure, and may split the reference coding unit based on at least one of the block shape information and the split shape information according to various embodiments.

Figure 15:
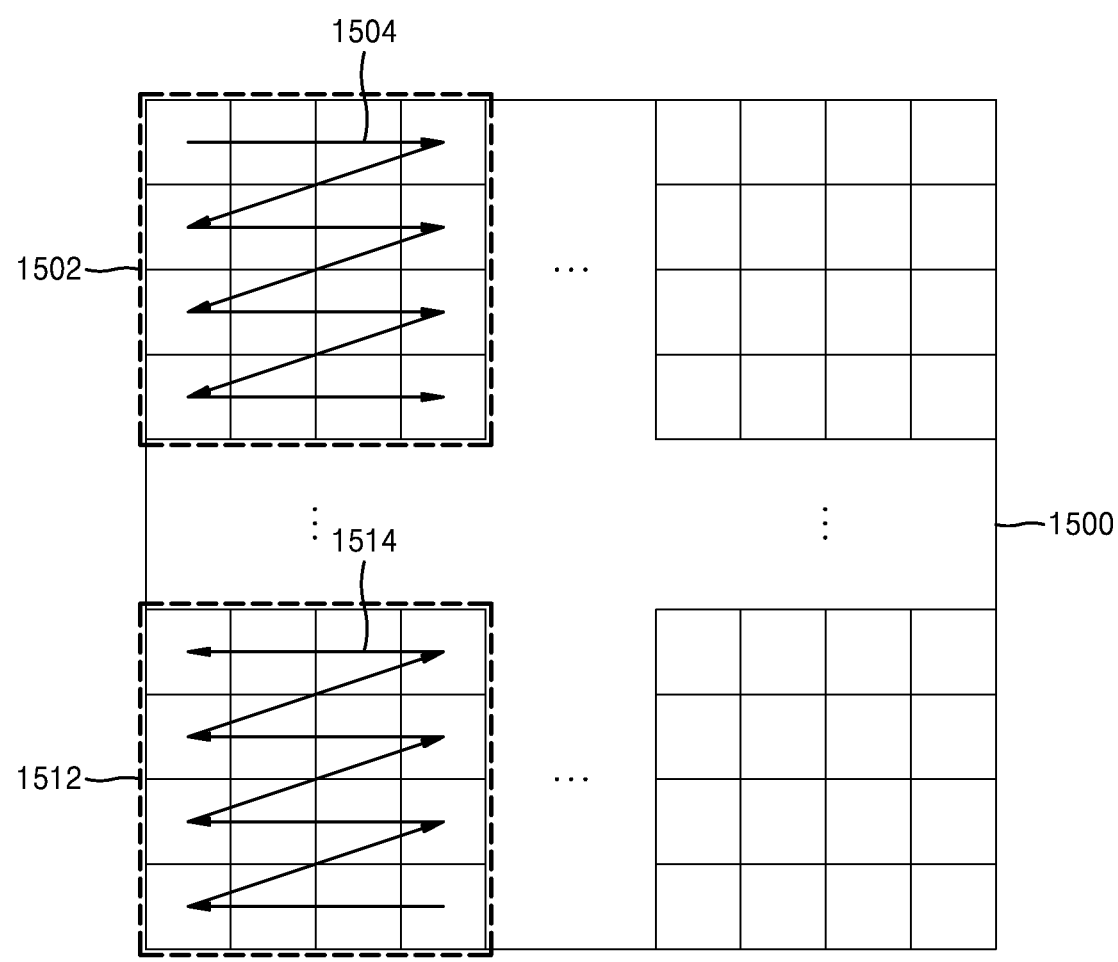
FIG. 15 illustrates a processing block serving as a unit for determining a determination order of reference coding units included in a picture, according to an embodiment.

FIG. 15 illustrates a processing block serving as a unit for determining a determination order of reference coding units included in a picture 1500, according to an embodiment.

According to an embodiment, the video decoding apparatus 150 may determine one or more processing blocks split from a picture. The processing block is a data unit including one or more reference coding units split from a picture, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the video decoding apparatus 150 may obtain processing block size information and may determine the size of one or more processing blocks included in the picture. The video decoding apparatus 150 may obtain the processing block size information from a bitstream and may determine the size of one or more processing blocks included in the picture. The size of processing blocks may be a predetermined size of data units, which is indicated by the processing block size information.

According to an embodiment, the receiver 160 of the video decoding apparatus 150 may obtain the processing block size information from the bitstream according to each specific data unit. For example, the processing block size information may be obtained from the bitstream in a data unit such as an image, sequence, picture, slice, or slice segment. That is, the receiver 160 may obtain the processing block size information from the bitstream according to each of the various data units, and the video decoding apparatus 150 may determine the size of one or more processing blocks, which are split from the picture, by using the obtained processing block size information. The size of the processing blocks may be integer times that of the reference coding units.

According to an embodiment, the video decoding apparatus 150 may determine the size of processing blocks 1502 and 1512 included in the picture 1500. For example, the video decoding apparatus 150 may determine the size of processing blocks based on the processing block size information obtained from the bitstream. Referring to FIG. 15, according to an embodiment, the video decoding apparatus 150 may determine a width of the processing blocks 1502 and 1512 to be four times the width of the reference coding units, and may determine a height of the processing blocks 1502 and 1512 to be four times the height of the reference coding units. The video decoding apparatus 150 may determine a determination order of one or more reference coding units in one or more processing blocks.

According to an embodiment, the video decoding apparatus 150 may determine the processing blocks 1502 and 1512, which are included in the picture 1500, based on the size of processing blocks, and may determine a determination order of one or more reference coding units in the processing blocks 1502 and 1512. According to an embodiment, determination of reference coding units may include determination of the size of the reference coding units.

According to an embodiment, the video decoding apparatus 150 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the video decoding apparatus 150 may obtain, from the bitstream, the determination order information of reference coding units according to each specific data unit. For example, the receiver 160 may obtain the determination order information of reference coding units from the bitstream according to each data unit such as an image, sequence, picture, slice, slice segment, or processing block. Because the determination order information of reference coding units indicates an order for determining reference coding units in a processing block, the determination order information may be obtained with respect to each specific data unit including an integer number of processing blocks.

According to an embodiment, the video decoding apparatus 150 may determine one or more reference coding units based on the determined determination order.

According to an embodiment, the receiver 160 may obtain the determination order information of reference coding units from the bitstream as information related to the processing blocks 1502 and 1512, and the video decoding apparatus 150 may determine a determination order of one or more reference coding units included in the processing blocks 1502 and 1512 and determine one or more reference coding units, which are included in the picture 1500, based on the determination order. Referring to FIG. 15, the video decoding apparatus 150 may determine determination orders 1504 and 1514 of one or more reference coding units in the processing blocks 1502 and 1512, respectively. For example, when the determination order information of reference coding units is obtained with respect to each processing block, different types of the determination order information of reference coding units may be obtained for the processing blocks 1502 and 1512. When the determination order 1504 of reference coding units in the processing block 1502 is a raster scan order, reference coding units included in the processing block 1502 may be determined according to a raster scan order. On the contrary, when the determination order 1514 of reference coding units in the other processing block 1512 is a backward raster scan order, reference coding units included in the processing block 1512 may be determined according to the backward raster scan order. FIGS. 1 to 15 illustrate a method of splitting an image into a largest coding unit and splitting the largest coding unit into coding units of a hierarchical tree structure. A coding order of sub-blocks split from a current block will be described with reference to FIGS. 16 to 24 below.

Figure 16:
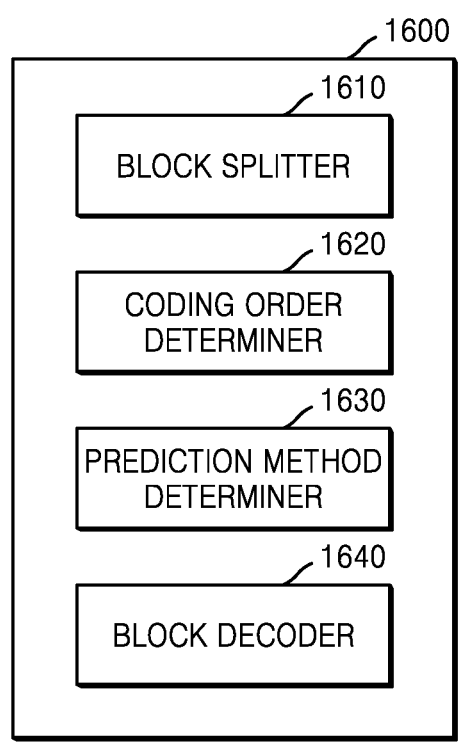
FIG. 16 illustrates a video decoding apparatus related to splitting of a current block and determination of a coding order of sub-blocks split from the current block, according to an embodiment.

FIG. 16 illustrates a video decoding apparatus 1600 related to splitting of a current block and determination of a coding order of sub-blocks split from the current block, according to an embodiment.

The video decoding apparatus 1600 includes a block splitter 1610, a coding order determiner 1620, a prediction method determiner 1630, and a block decoder 1640.

In FIG. 16, the block splitter 1610, the coding order determiner 1620, the prediction method determiner 1630, and the block decoder 1640 are illustrated as separate components but may be combined into the same component in another embodiment.

In FIG. 16, the block splitter 1610, the coding order determiner 1620, the prediction method determiner 1630, and the block decoder 1640 are illustrated as being included in one apparatus but devices performing functions thereof may not be necessarily physically adjacent to each other. Therefore, in an embodiment, the block splitter 1610, the coding order determiner 1620, the prediction method determiner 1630, and the block decoder 1640 may be dispersed.

The block splitter 1610, the coding order determiner 1620, the prediction method determiner 1630, and the block decoder 1640 may be implemented by one processor according to an embodiment. In an embodiment, the block splitter 1610, the coding order determiner 1620, the prediction method determiner 1630, and the block decoder 1640 may be implemented by a plurality of processors.

The functions performed by the block splitter 1610, the coding order determiner 1620, the prediction method determiner 1630, and the block decoder 1640 of FIG. 16 may be performed by the decoder 180 of FIG. 1B.

The block splitter 1610 may obtain split information indicating whether a current block is to be split. The split information indicates whether to split the current block into two or more smaller blocks. In addition, when the split information indicates splitting of the current block, the block splitter 1610 splits the current block into two or more sub-blocks.

The current block may be split into various forms according to the shape thereof. For example, when the current block is a square, the current block may be split into four square sub-blocks according to the split information.

When two or more splitting methods are allowed according to a shape of the current block, the block splitter 1610 may select a splitting method, based on split shape information. Thus, when the split information indicates splitting of the current block, the block splitter 1610 may obtain split shape information indicating a splitting method of the current block. The block splitter 1610 may split the current block according to the splitting method indicated by the split shape information.

For example, when the current block is a 2N×2N square, the split shape information may indicate a splitting method applied to the current block among N×N splitting, 2N×N splitting, N×2N partitioning, vertical non-uniform trisection, and horizontal non-uniform trisection. N×N splitting is a method of splitting a current block into four N×N blocks. 2N×N splitting is a method of splitting a current block into 2N×N blocks. N×2N splitting is a method of splitting a current block into N×2N blocks. Horizontal non-uniform trisection refers to a method of splitting a 2N×2N block into three blocks having the same width and a height ratio of 1:2:1. Vertical non-uniform trisection refers to a method of splitting a 2N×2N block into three blocks having the same height and having a width ratio of 1:2:1. In addition, the current block may be split by one of various horizontal splitting methods or vertical splitting methods.

When the current block is a 2N×N rectangle long in a vertical direction, the split shape information may indicate a splitting method applied to the current block among N×N splitting and horizontal non-uniform trisection. N×N splitting is a method of splitting a current block into two N×N blocks. Horizontal non-uniform trisection refers to a method of splitting a 2N×N block into three blocks having the same width and a height ratio of 1:2:1. In addition, the current block may be split by one of various horizontal splitting methods or vertical splitting methods.

When the current block is an N×2N rectangle long in a horizontal direction, the split shape information may indicate a splitting method applied to the current block among N×N splitting and vertical non-uniform trisection. N×N splitting is a method of splitting a current block into two N×N blocks. Vertical non-uniform trisection refers to a method of splitting an N×2N block into three blocks having the same height and having a width ratio of 1:2:1. In addition, the current block may be split by one of various horizontal splitting methods or vertical splitting methods.

In addition to the above splitting methods, a method of splitting a current block into an asymmetrical ratio, a method of splitting a current block into triangles, a method of splitting a current block into other geometric shapes, and the like are applicable to splitting a current block having a square or rectangular shape.

The block splitter 1610 does not split the current block when the split information does not indicate splitting of the current block. The block decoder 1640 decodes the current block.

When the current block is a coding unit, the block splitter 1610 determines the current block as a final coding unit. The final coding unit is not split into coding units of a higher depth. In an embodiment, when the current block that is the final coding unit is split into data units other than coding units, the block decoder 1640 may cause the block splitter 1610 to slit the current block.

In an embodiment, the block splitter 1610 may split the current block into one or more prediction units according to a hierarchical tree structure. Similarly, the block splitter 1610 may split the current block into one or more transform units according to a hierarchical tree structure. The block decoder 1640 may reconstruct the current block according to a result of prediction of a prediction unit and a result of transformation of a transform unit.

When the current block is a prediction unit, the block decoder 1640 may perform prediction on the current block. When the current block is a transform unit, the block decoder 1640 may obtain residual data by inverse quantization and inverse transformation of quantized transform coefficients of the current block.

The coding order determiner 1620 obtains coding order information indicating a coding order of sub-blocks. In addition, the coding order determiner 1620 may determine a decoding order of sub-blocks according to the obtained coding order information.

A coding order of the sub-blocks may include a horizontal coding order and a vertical coding order. The horizontal coding order indicates a decoding order of left and right neighboring sub-blocks. The vertical coding order indicates a decoding order of upper and lower neighboring sub-blocks.

The coding order information indicates a coding order of two or more sub-blocks included in the current block. A data amount of the coding order information is determined according to the number of the sub-blocks and a coding order determination method.

For example, when there are two sub-blocks, the coding order information may be determined to indicate a first coded sub-block among the two sub-blocks. Therefore, the coding order information may be a flag that is 1-bit data.

However, when there are four sub-blocks, the number of cases of coding orders of the sub-blocks is 4!=24. Therefore, 5-bit data is required to represent the 24 coding orders. That is, as the number of sub-blocks increases, the number of cases of coding orders increases. Accordingly, in order to reduce the data amount of the coding order information, a coding order determination method may be used to determine a coding order by determining whether a coding order of some pairs of sub-blocks is swapped in a predetermined basic coding order. The coding order information indicating whether the coding order of the pairs of sub-blocks is swapped indicates a forward direction or a reverse direction with respect to the basic coding order.

For example, when a 2N×2N current block is split into four N×N blocks, a horizontal coding order may be determined for a pair of upper blocks including two upper sub-blocks and a pair of lower blocks including two lower sub-blocks. The horizontal coding order of the pair of upper blocks and the pair of lower blocks may be determined according to whether this coding order is a forward direction or a reverse direction with respect to the basic coding order.

Figure 18A:
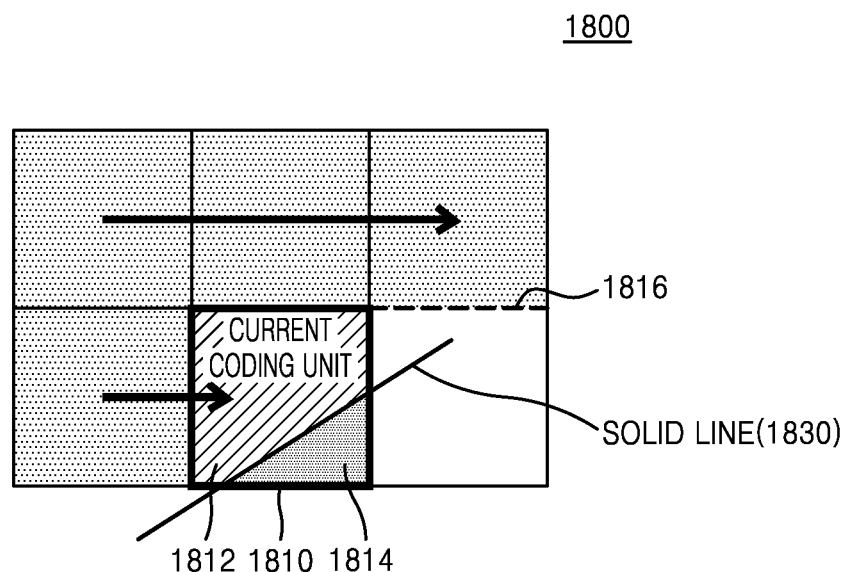
FIGS. 18A and 18B illustrate a case in which a coding unit is encoded in a forward direction and cases in which a coding unit is encoded in a reverse direction, respectively.
Figure 18B:
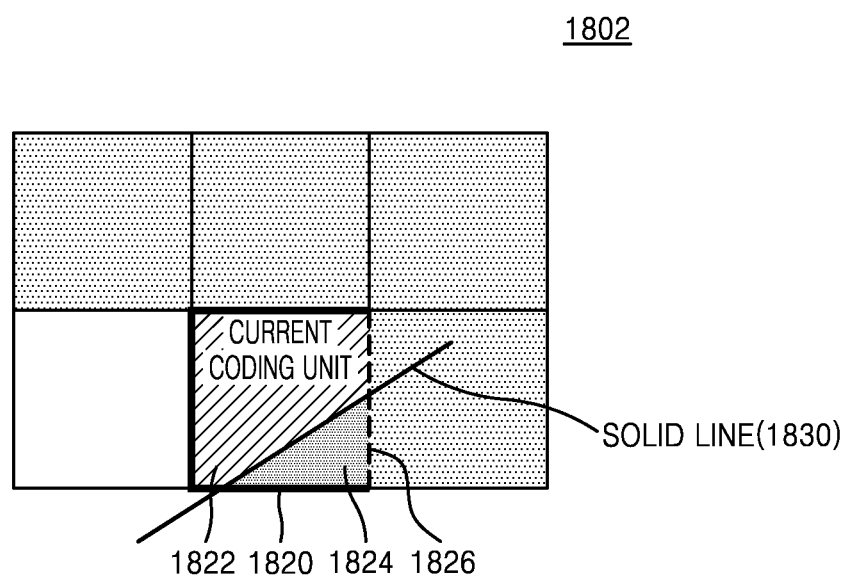

A current picture including a current block is encoded and decoded according to the basic coding order. Therefore, sub-blocks of the same level split from the current block are also encoded and decoded according to the basic coding order. Embodiments of the basic coding order are illustrated in FIGS. 18A to 18C to be described later.

Therefore, when the pair of lower blocks are encoded according to the basic coding order, the pair of lower blocks are considered as being encoded in the forward direction. On the contrary, when the pair of lower blocks are encoded in an order reverse to the basic coding order, the pair of lower blocks are considered as being encoded in the reverse direction.

For example, when the current block is vertically split to obtain two sub-blocks adjacent to each other in the horizontal direction and encode the sub-blocks in the forward direction, the horizontal coding order may be determined such that a left sub-block may be first decoded. On the contrary, when two sub-blocks adjacent to each other in the horizontal direction are encoded in the reverse direction, the horizontal coding order may be determined such that a right sub-block may be first decoded.

For example, when the current block is horizontally split to obtain two sub-blocks adjacent to each other in the vertical direction and encode the sub-blocks in the forward direction, the vertical coding order may be determined such that an upper sub-block may be first decoded. On the contrary, when two sub-blocks adjacent to each other in the vertical direction are encoded in the reverse direction, the vertical coding order may be determined such that a lower sub-block may be first decoded.

In an embodiment, the coding order determiner 1620 may encode sub-blocks adjacent to each other in the vertical direction only in the forward direction. Therefore, in the above embodiment, the coding order information represents only the horizontal coding order of the sub-blocks.

When the coding order information indicates only a coding order of a pair of sub-blocks, the coding order information is 1-bit data. The coding order information which is 1-bit data may be defined as a coding order flag.

The coding order determiner 1620 may obtain the coding order information from a bitstream. The coding order information may be located after split information in the bitstream.

Figure 17A:
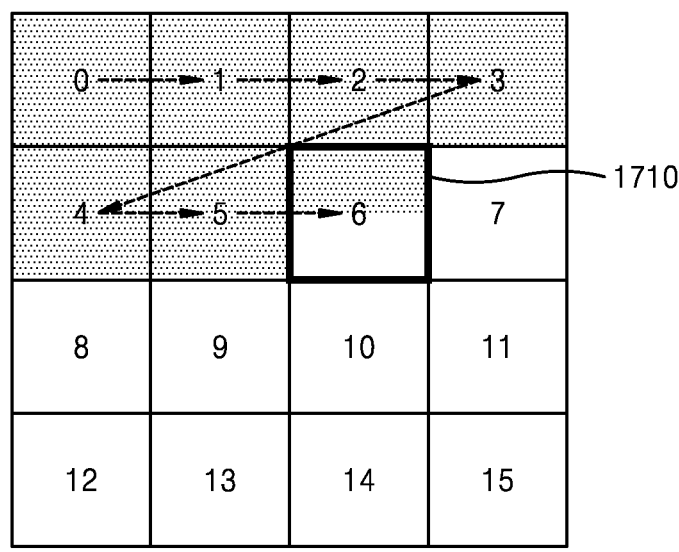
FIGS. 17A to 17C illustrate a basic coding order according to an embodiment.
Figure 17B:
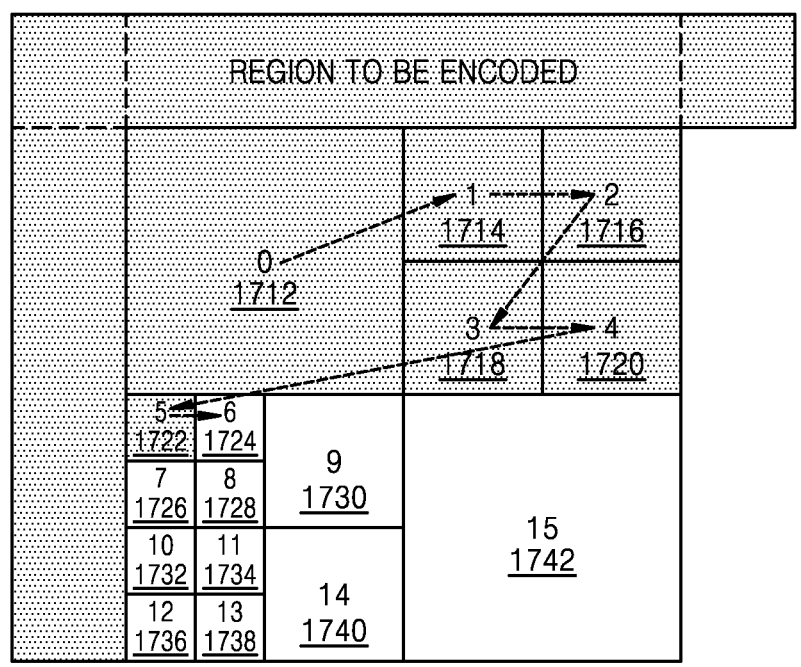
Figure 17C:
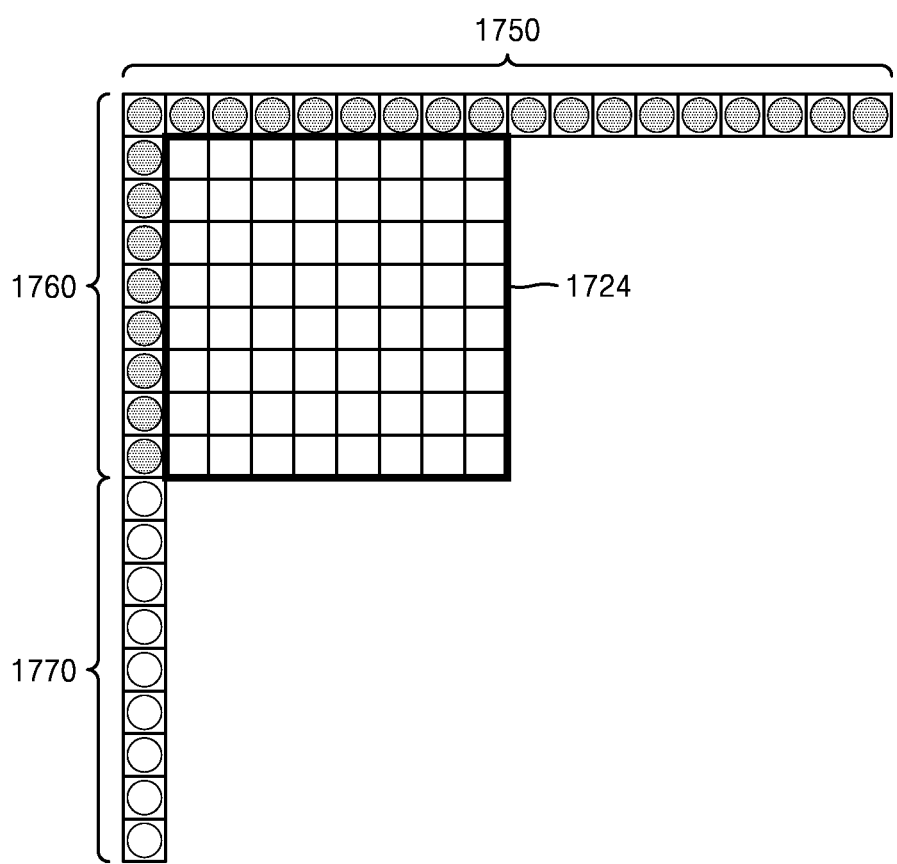

In relation to the coding order determiner 1620, a basic coding order according to an embodiment is illustrated in FIGS. 17A to 17C. The basic coding order of FIGS. 17A to 17C is a Z coding order. According to the Z coding order, data units are coded from left to right, and after all data units in a current row are coded, data units in a row below the current row are coded from left to right. The Z coding order described above is called a raster scan order.

FIG. 17A illustrates coding orders according to the Z coding order of largest coding units included in a current picture 1700. Indexes 0 to 15 are set for the largest coding units according to the Z coding order. According to the Z coding order, largest coding units with indexes 0 to 3, which are located in a first row, are first encoded and then largest coding units with indexes 4 to 7, which are located in a second row, are set are encoded from left to right. The largest coding units are also internally coded according to the Z coding order.

FIG. 17B illustrates a coding order of a largest coding unit 1710 with index 6 among the largest coding units included in the current picture 1700. Indexes 0 to 15 are set for coding units of a final depth which have been split according to the Z coding order. The Z coding order is applied to data units of the same depth. In addition, a coding unit of a depth n and with lower priority is not encoded until all sub-coding units of the coding unit of the depth n are encoded. For example, a coding unit with index 15 is not encoded until all coding units with indexes 5 to 14 are encoded. The coding units are also internally coded according to the Z coding order.

FIG. 17C illustrates a reference sample referenced by a coding unit 1724 with index 6 among coding units included in the largest coding unit 1710. Only a coding unit 1712 with index 0 and a coding unit 1722 with index 5 which are neighboring to the coding unit 1724 with index 6 which is currently being encoded are reconstructed. Accordingly, only a pixel 1750 of the coding unit 1712 and a pixel 1760 of the coding unit 1722 may be used as reference samples for the coding unit 1724.

The Z coding order of FIGS. 17A to 17C is applicable in different directions according to data units. For example, the Z coding order may be changed to encode data units in the same row from the right to the left. Alternatively, the Z coding order may be changed such that data units in a row above a current row are encoded after all data units in the current row are encoded. Alternatively, the Z coding order may be changed such that data units in the same column are encoded from top to bottom and data units in a column on the right side of a current column are encoded after all data units in the current column are encoded.

In relation to the coding order determiner 1620, FIGS. 18A and 18B illustrate a case 1800 in which a coding unit 1810 is encoded in a forward direction and a case 1802 in which a coding unit 1820 is encoded in a reverse direction, respectively. Effects obtained by changing a coding order will be explained with reference to FIGS. 18A and 18B below.

The coding units 1810 and 1820 of FIGS. 18A and 18B are predicted according to an upper-right-direction intra mode. In FIGS. 18A and 18B, a solid line 1830 represents pixels of an original image that are arranged in a straight line and have certain values. Thus, when a current coding unit is predicted in a direction of the solid line 1830, the accuracy of prediction of the coding units 1810 and 1820 will be improved.

In the case 1800 in which the coding unit 1810 is encoded in the forward direction, a left coding unit, an upper coding unit, and an upper right coding unit of the current coding unit 1810 are reconstructed before the current coding unit 1810. Therefore, pixels or encoding information of the left coding unit, the upper coding unit, and the upper right coding unit is referenced by the current coding unit 1810. For example, pixels 1816 at a lower edge of the upper right coding unit are used for prediction of the current coding unit 1810. The pixels 1816 may be spatially separated from the current coding unit 1810 and thus the accuracy of prediction of a portion 1814 of the current coding unit 1810 may be low.

However, a right coding unit, the upper coding unit, and an upper left coding unit of the current coding unit 1810 are reconstructed before the current coding unit 1820 in the case 1802 in which the current coding unit 1820 is encoded in the reverse direction, and thus, in intra prediction, pixels 1826 at a left corner of the right coding unit may be used for prediction of the current coding unit 1820. Because the pixels 1826 are neighboring to the current coding unit 1820, the accuracy of prediction of a portion 1824 of the current coding unit 1820 may be higher than the accuracy of prediction of the portion 1814 of the current coding unit 1810.

As in the embodiment of the intra prediction described above with reference to FIGS. 18A and 18B, there are many cases in which prediction accuracy may be improved by obtaining encoding information from blocks located in a reverse direction even in inter prediction. When a current coding unit and a coding unit on the right side of the current coding unit are related to the same object, motion information of the current coding unit may be substantially the same as that of the right coding unit. Therefore, coding efficiency may be increased by deriving the motion information of the current coding unit from the motion information of the right coding unit.

Therefore, coding efficiency of an image may be improved by determining a coding order based on a comparison between coding efficiency when the current coding unit is encoded in the forward direction and coding efficiency when the current coding unit is encoded in the reverse direction.

The coding order information may be set to be the same as that applied to an upper block of a current block. For example, when the current block is a prediction unit or a transform unit, the coding order determiner 1620 may apply coding order information applied to a coding unit including the current block to the current block. As another example, when the current block is a coding unit, the coding order determiner 1620 may apply coding order information applied to a coding unit of a depth lower than that of the current block to the current block.

When there are two or more coding order flags for the current block, the coding order determiner 1620 may obtain only one coding order flag from the bitstream and determine the remaining coding order flags to be connected with the coding order flag obtained from the bitstream.

Figure 19:
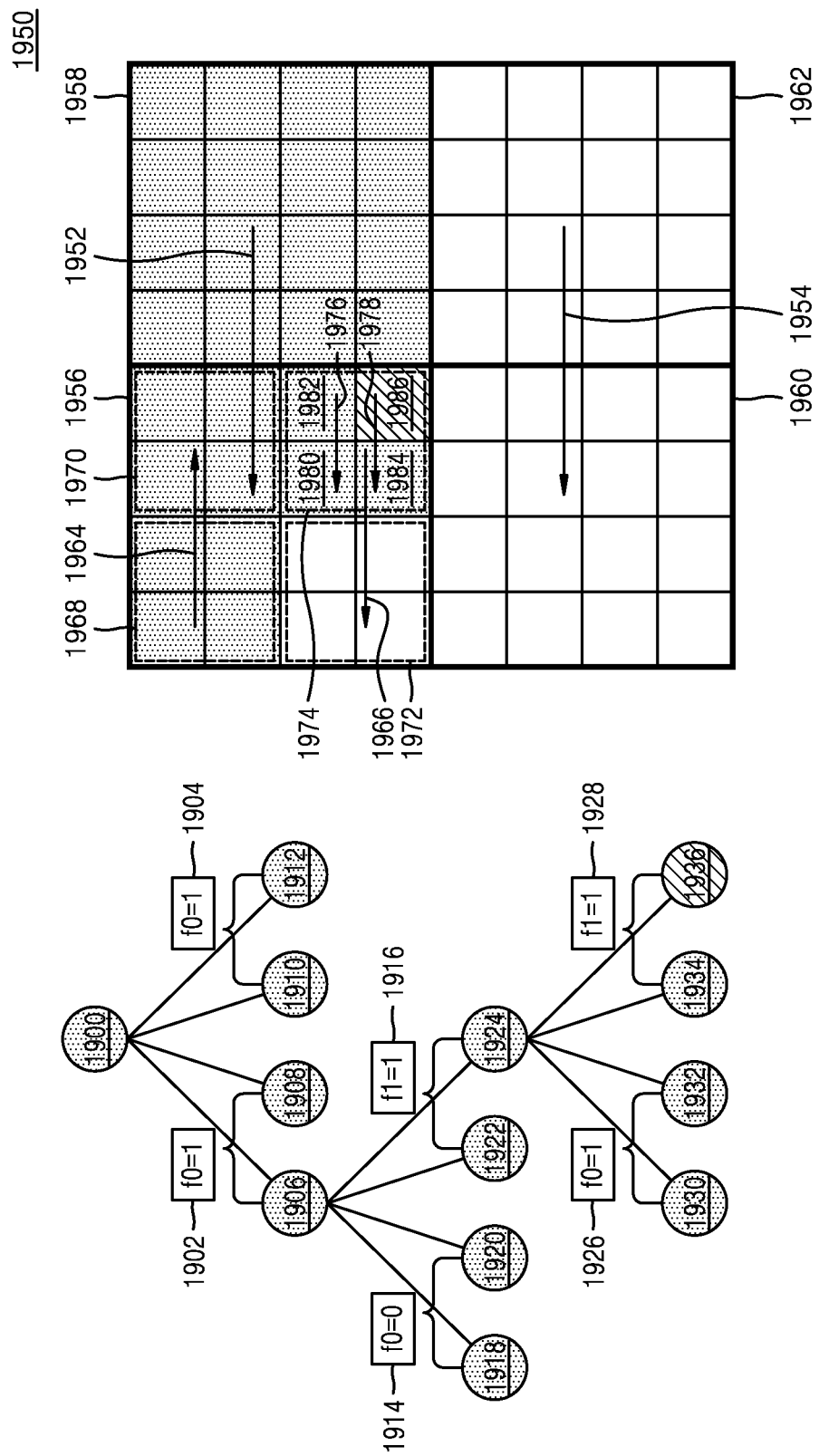
FIG. 19 illustrates a tree structure of a largest coding unit for explaining a coding order of the largest coding unit and coding units included in the largest coding unit.

In relation to a coding order determination of the coding order determiner 1620, FIG. 19 illustrates a tree structure of a largest coding unit for explaining a coding order of the largest coding unit and coding units included in the largest coding unit.

A largest coding unit 1950 is split into a plurality of coding units 1956, 1958, 1960, 1962, 1968, 1970, 1972, 1974, 1980, 1982, 1984, and 1986. The largest coding unit 1950 corresponds to a highest node 1900 of a tree structure. The plurality of coding units 1956, 1958, 1960, 1962, 1968, 1970, 1972, 1974, 1980, 1982, 1984, and 1986 correspond to a plurality of nodes 1906, 1908, 1910, 1912, 1918, 1920, 1922, 1924, 1930, 1932, 1934, and 1936, respectively. Upper coding order flags 1902, 1914, and 1926 representing a coding order of the tree structure correspond to arrows 1952, 1964, and 1976, and upper coding order flags 1904, 1916, and 1928 correspond to arrows 1954, 1966, and 1978.

An upper coding order flag indicates a coding order of two upper coding units among four coding units of the same depth. When the upper coding order flag is 0, coding is performed in the forward direction. On the contrary, when the upper coding order flag is 1, coding is performed in the reverse direction.

Similarly, a lower coding order flag indicates a coding order of two lower coding units among four coding units of the same depth. When the lower coding order flag is 0, coding is performed in the forward direction. On the contrary, when the lower coding order flag is 1, coding is performed in the reverse direction.

For example, because the upper coding order flag 1914 is 0, a coding order between the coding units 1968 and 1970 is determined as a direction from left to right, which is a forward direction. Because the lower coding order flag 1916 is 1, a coding order between the coding units 1972 and 1974 is determined as a direction from right to left, which is a reverse direction.

In an embodiment, an upper coding order flag and a lower coding order flag may be set to have the same value. For example, when the upper coding order flag 1902 is determined as 1, the lower coding order flag 1904 corresponding thereto may also be determined as 1. Because values of an upper coding order flag and a lower coding order flag are determined as 1-bit values, the amount of the coding order information is reduced.

In an embodiment, an upper coding order flag and a lower coding order flag of a current coding unit may be determined by referring to at least one of an upper coding order flag and a lower coding order flag applied to a coding unit of a depth lower than that of the current coding unit. For example, the upper coding order flag 1926 and the lower coding order flag 1928 applied to the coding units 1980, 1982, 1984, and 1986 may be determined based on the lower coding order flag 1916 applied to the coding units 1972 and 1974. Accordingly, the upper coding order flag 1926 and the lower coding order flag 1928 may be determined to be the same value as the coding order flag 1916. Because values of an upper coding order flag and a lower coding order flag are determined from a higher coding unit of a current coding unit, coding order information is not obtained from the bitstream. Therefore, the amount of the coding order information is reduced.

The coding order determiner 1620 may apply lower horizontal coding information applied to sub-blocks of the current block according to higher horizontal coding order information applied to the current block, based on at least one of split information, size information, and neighboring block information of the current block. Therefore, when conditions according to the split information, the size information and the neighboring block information of the current block are satisfied, the coding order determiner 1620 does not obtain horizontal coding order information from the bitstream and may determine lower horizontal coding order information of the current block, based on the higher horizontal coding order information of the current block. As a result, the coding order determiner 1620 may increase a coding rate by determining the lower horizontal coding order of the current block under a specific condition without obtaining the horizontal coding order information from the bitstream.

The horizontal coding order indicates a coding order of left and right neighboring sub-blocks. The horizontal coding order information also indicates a horizontal coding order. The higher horizontal coding order information indicates an upper horizontal coding order, and the lower horizontal coding order information indicates a lower horizontal coding order.

The higher horizontal coding order of the current block indicates a horizontal coding order of the current block or a higher block of the current block. The lower horizontal coding order of the current block indicates a horizontal coding order of the sub-blocks included in the current block. In addition, the higher horizontal coding order and the lower horizontal coding order are terms defined based on the current block and thus a horizontal coding order of blocks may be a higher horizontal coding order or a lower horizontal coding order according to a reference block used as a determination criterion. For example, the higher horizontal coding order of the current block may be a lower horizontal coding order with respect to an upper block of the current block. In contrast, the lower horizontal coding order of the current block may be an upper horizontal coding order with respect to a sub-block of the current block.

In an embodiment, the upper horizontal coding order and the lower horizontal coding order are used only when the current block is vertically split. When the current block is horizontally split, a sub-block of the current block is decoded from top to bottom regardless of the upper horizontal coding order and the lower horizontal coding order. The higher horizontal coding order and the lower horizontal coding order may indicate the forward direction (from left to right) or the reverse direction (from right to left). Therefore, the upper horizontal coding order and the lower horizontal coding order do not represent a downward direction or an upward direction.

Figure 20:
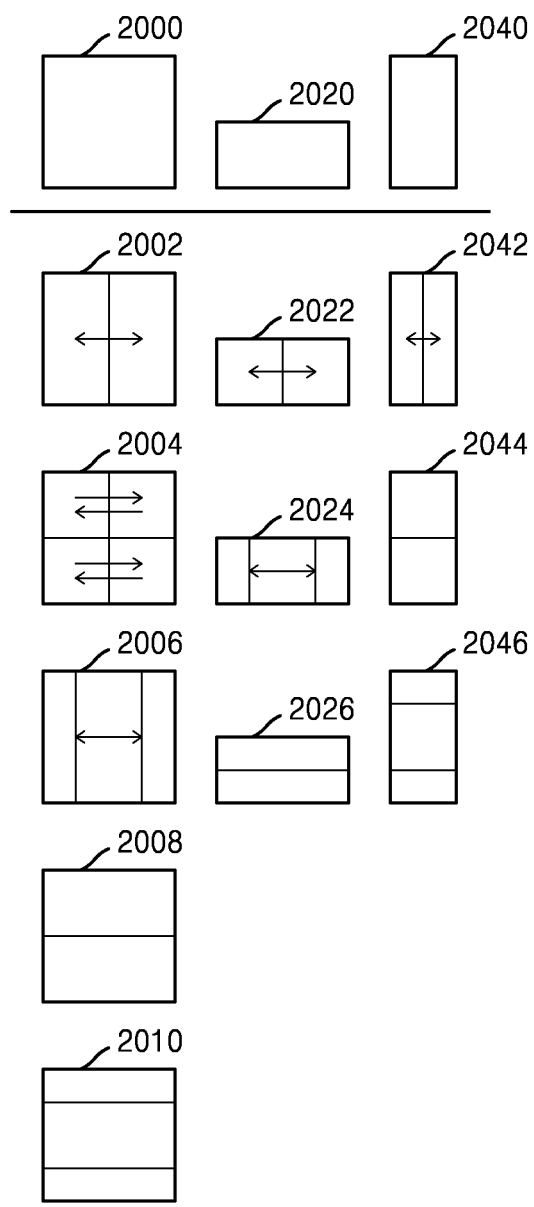
FIG. 20 illustrates determining a horizontal coding order of sub-blocks split vertically according to an embodiment.

FIG. 20 illustrates determining a horizontal coding order of sub-blocks split vertically according to an embodiment.

When a size of a current block 2000 is 2N×2N, lower horizontal coding order of the current block 2000 is determined when the current block 2000 is split into two sub-blocks 2002 having a size of 2N×N, four sub-blocks 2004 having a size of N×N or three sub-blocks 2006 having sizes of 2N×N/2, 2N×N, and 2N×N/2. The determined lower horizontal coding order is applied to the sub-blocks of the current block 2000.

However, sub-blocks of the current block 2000 are decoded only in the downward direction when the current block 2000 is split into two sub-blocks 2008 having a size of N×2N or three sub-blocks 2010 having sizes of 2/N×2N, N×2N, and 2/N×2N. Therefore, even when the lower horizontal coding order of the current block 2000 is determined, the determined lower horizontal coding order is not applied to the sub-blocks of the current block 2000.

When a size of a current block 2020 is N×2N, a lower horizontal encoding order of the current block 2020 is determined when the current block 2020 is split into two sub-blocks 2022 having a size of N×N or three sub-blocks 2024 having sizes of N×N/2, N×N, and N×N/2. The determined lower horizontal coding order is applied to the sub-blocks of the current block 2020.

However, when the current block 2020 is split into two N/2×2N blocks 2026, sub-blocks of the current block 2020 are decoded only in the downward direction. Therefore, even when a lower horizontal coding order of the current block 2020 is determined, the determined lower horizontal coding order is not applied to the sub-blocks of the current block 2020.

When a size of a current block 2040 is 2N×N, a lower horizontal coding order of the current block 2040 is determined when the current block 2040 is split into two 2N×N/2 blocks 2042. The determined lower horizontal coding order is applied to the sub-blocks of the current block 2040.

However, the sub-blocks of the current block 2040 are decoded only in the downward direction when the current block 2040 is split into two N×N blocks 2044 or three 2/N×N, N×N and 2/N×N blocks 2046. Therefore, even when the lower horizontal coding order of the current block 2040 is determined, the determined lower horizontal coding order is not applied to the sub-blocks of the current block 2040.

Therefore, according to the embodiment of FIG. 20, sub-blocks of a current block are decoded according to a lower horizontal coding order only when the current block is vertically split. However, when the current block is split only horizontally, an upper sub-block is decoded before a lower sub-block regardless of the lower horizontal coding order.

The coding order determiner 1620 may determine lower horizontal coding order information according to higher horizontal coding order information applied to the current block even when the split information of the current block indicates horizontal splitting of the current block. However, the determined lower horizontal coding order is not applied to the sub-blocks of the current block and the sub-blocks are decoded in the downward direction.

However, the lower horizontal coding order information of the current block may be referenced by a second sub-block split from a sub-block and thus the lower horizontal coding order information of the current block is determined. Therefore, even when the current block is generated by horizontally splitting a higher block, the coding order determiner 1620 may determine the lower horizontal coding order information of the current block from the higher horizontal coding order information of the current block.

When a first size value according to the size information of the current block is greater than a minimum SUCO size value, the coding order determiner 1620 may determine the lower horizontal coding order according to the higher horizontal coding order applied to the current block. Alternatively, when the first size value according to the size information of the current block is less than the minimum SUCO size value, the coding order determiner 1620 may determine the lower horizontal coding order according to the higher horizontal coding order applied to the current block. The first size value represents a smaller value among a height and a width of the current block. Alternatively, the first size value may be a binary log value of the smaller value among the height and the width of the current block.

When a second size value according to the size information of the current block is less than a maximum SUCO size value, the coding order determiner 1620 may determine lower horizontal coding order information of sub-blocks according to the higher horizontal coding order information applied to the current block. Alternatively, when the second size value according to the size information of the current block is greater than the maximum SUCO size value, the coding order determiner 1620 may determine the lower horizontal coding order information of the sub-blocks according to the higher horizontal coding order information applied to the current block. The second size value represents a larger value among the height and the width of the current block. Alternatively, the second size value may be a binary log value of the larger value among the height and the width of the current block.

In an embodiment, the coding order determiner 1620 may determine the lower horizontal coding order information of the sub-blocks according to the higher horizontal coding order information applied to the current block when the first size value according to the size information of the current block is greater than the minimum SUCO size value and the second size value according to the size information of the current block is less than the maximum SUCO size value.

In an embodiment, the first size value or the second size value may be determined as a value ((width+height)>>1) obtained by shifting the sum of the height and the width of the current block to the right. Alternatively, the first size value or the second size value may be determined as a value ((log 2(width)+log 2(height))>>1) obtained by shifting the sum of a binary log value of the height of the current block and a binary log value of the width of the current block.

The coding order determiner 1620 may obtain minimum SUCO size information indicating the minimum SUCO size value with respect to a higher data unit of the current block. In addition, the coding order determiner 1620 may obtain maximum SUCO size information indicating the maximum SUCO size value with respect to the higher data unit of the current block. The higher data unit of the current block may be one of a coding tree block, a slice segment, a slice, and a picture, which includes the current block.

The minimum SUCO size value represents a minimum size of a block that allows switching of a horizontal coding order in the higher data unit. The maximum SUCO size value represents a maximum size of a block that allows switching of the horizontal coding order in the higher data unit.

The minimum SUCO size information may represent a value obtained by subtracting a predetermined number from the minimum SUCO size value. Similarly, the maximum SUCO size information may represent a value obtained by subtracting the predetermined number from the maximum SUCO size value. The predetermined number may be determined from the minimum size of the block that allows switching of the horizontal coding order in a video encoder. Therefore, the minimum SUCO size value is set to be equal to or greater than the predetermined number.

The coding order determiner 1620 may determine the lower horizontal coding order of the sub-blocks according to a position of a neighboring block decoded before the current block, the neighboring block being indicated by the neighboring block information of the current block. The neighboring block information of the current block represents information regarding the neighboring block of the current block. The neighboring block information may indicate whether the neighboring block of the current block is decoded before the current block.

For example, the coding order determiner 1620 may determine the lower horizontal coding order such that decoding is performed starting from a sub-block neighboring to a larger number of decoded blocks among a plurality of sub-blocks. Therefore, when the number of decoded blocks neighboring to a right sub-block is greater than the number of decoded blocks neighboring to a left sub-block, the right sub-block may be decoded before the left sub-block.

As another example, the coding order determiner 1620 may determine the lower horizontal coding order of the sub-blocks according to whether a left neighboring block and a right neighboring block of the current block are decoded before the current block. When only the right neighboring block of the current block is decoded before the current block, the right sub-block may be decoded before the left sub-block. In contrast, when only the left neighboring block of the current block is decoded before the current block, the left sub-block may be decoded before the right sub-block.

The coding order determiner 1620 may determine the lower horizontal coding order information of the current block according to horizontal coding order information lately obtained from the bitstream. For example, when a neighboring block of the current block is decoded before the current block and lower horizontal coding order information of the neighboring block is determined according to the horizontal coding order information lately obtained from the bitstream, the lower horizontal coding order of the current block may be determined according to the lower horizontal coding order of the neighboring block.

As another example, when a sub-block of a neighboring block of the current block is decoded before the current block and lower horizontal coding order information of the sub-block of the neighboring block is determined according to the horizontal coding order information lately obtained from the bitstream, the lower horizontal coding order information of the current block may be determined according to the lower horizontal coding order information of the sub-block of the neighboring block. Accordingly, according to the above embodiments, the coding order determiner 1620 may determine the lower horizontal coding order information from lower horizontal coding order information of a block other than an upper block of the current block.

When there is no higher horizontal coding order information indicating a horizontal coding order applied to the current block, the coding order determiner 1620 may obtain horizontal coding order information indicating a lower horizontal coding order from the bitstream. When there is no higher horizontal coding order of the current block, lower horizontal coding order information of the current block cannot be determined from the higher horizontal coding order of the current block even when the condition according to the embodiment is satisfied.

Thus, even when the current block is vertically split and the condition of the condition of the embodiments is satisfied, horizontal coding order information representing a lower horizontal coding order may be obtained from the bitstream when there is no higher horizontal coding order information of the current block to be referenced for the current block. However, when the current block is horizontally split, a lower horizontal coding order of the current block does not necessarily need to be determined and thus horizontal coding order information may not be obtained from the bitstream even when there is no upper horizontal coding order.

In an embodiment, when the current block is a coding tree block or a largest coding block, the coding order determiner 1620 may determine a lower horizontal coding order to be the forward direction without obtaining horizontal coding order information from the bitstream.

Figure 21:
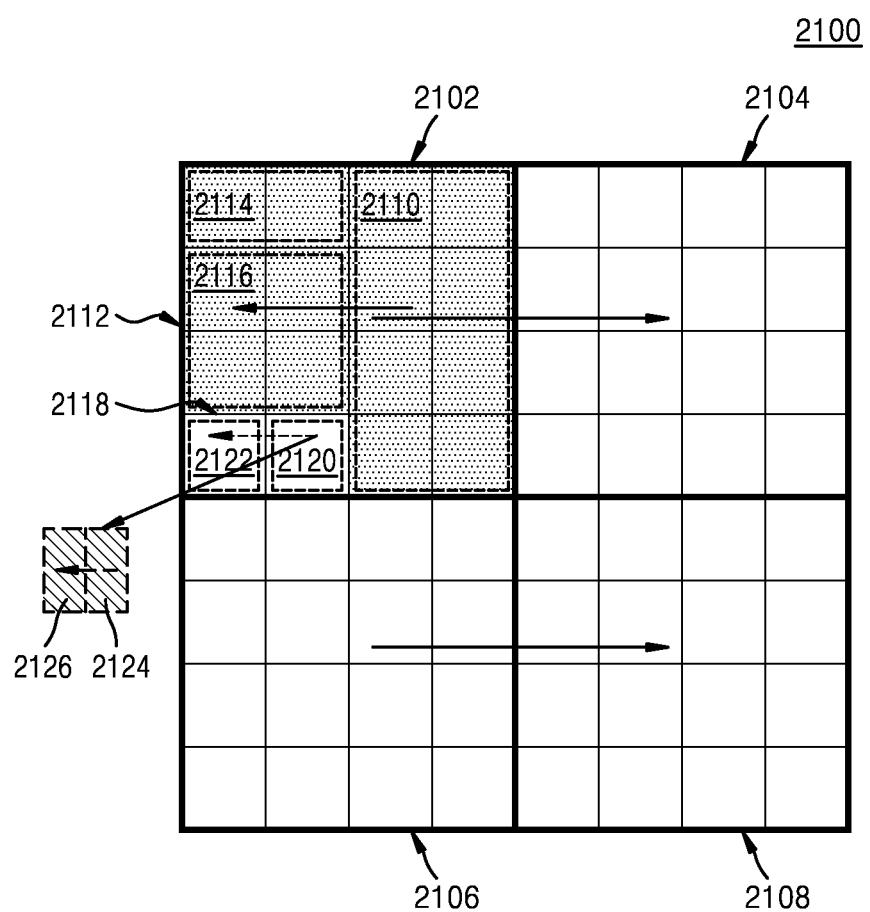
FIG. 21 illustrates determining a horizontal coding order of blocks without obtaining horizontal coding order information from a bitstream, according to an embodiment.

FIG. 21 illustrates determining a horizontal coding order of blocks without obtaining horizontal coding order information from a bitstream, according to an embodiment.

In FIG. 21, a size of a current coding tree block 2100 is 128×128. However, in an embodiment, the size of the current coding tree block 2100 may not be 128×128 but be 64×64, 256×256, or the like.

In FIG. 21 a minimum SUCO size value is 32. However, in an embodiment, the minimum SUCO size value may be 8, 16, 64, 128, 256, or the like.

In FIG. 21, when a first size value of a block is smaller than the minimum SUCO size value or sub-blocks of the block are adjacent to each other only in the vertical direction, a horizontal decoding order of the blocks is determined without obtaining horizontal coding order information from the bitstream. In FIG. 21, the first size value represents a smaller value among a height and a width of a current block.

The current coding tree block 2100 is split into 64×64 blocks. Thus, it is determined whether a horizontal decoding order of blocks 2102 and 2104 and a horizontal decoding order of blocks 2106 and 2108 are a forward or reverse direction.

A first size value of the current coding tree block 2100 is 128. Therefore, because the first size value of the current coding tree block 2100 is larger than the minimum SUCO size, a horizontal decoding order applied to the blocks 2102, 2104, 2106, and 2108 is determined according to the horizontal coding order information obtained from the bitstream. When the current coding tree block 2100 is split into four 64×64 blocks, a decoding order of the blocks 2102 and 2104 and a decoding order of blocks 2106 and 2108 are determined to be the same. Accordingly, the horizontal decoding order applied to the blocks 2102, 2104, 2106, and 2108 may be determined according to 1-bit horizontal coding order information.

In the embodiment of FIG. 21, the horizontal decoding order applied to the sub-blocks 2102, 2104, 2106, and 2108 of the current coding tree block 2100 is determined to be the forward direction. Accordingly, a coding order is determined as a decoding order of the blocks 2102, 2104, 2106, and 2108.

The block 2102 is split into 64×32 blocks. Thus, it is determined whether the horizontal decoding order of blocks 2110 and 2112 is a forward or reverse direction.

A first size value of the block 2102 is 32. Therefore, because the first size value of the block 2102 is equal to the minimum SUCO size, the horizontal decoding order applied to the blocks 2110 and 2112 is determined according to the horizontal coding order information obtained from the bitstream. In the embodiment of FIG. 21, the horizontal decoding order applied to the blocks 2110 and 2112 which are sub-blocks of the block 2102 is determined as the reverse direction. Thus, the block 2112 is decoded before the block 2110.

In the embodiment of FIG. 21, the block 2112 is not split. Thus, the block 2110 is decoded after the block 2112 is decoded.

The block 2110 is split into two 16×32 blocks and one 32×32 block. Therefore, the block 2110 is split into three sub-blocks 2114, 2116, and 2118. Because the sub-blocks 2114, 2116, and 2118 are vertically adjacent to each other, the horizontal decoding order thereof is not used to decode the blocks 2114, 2116, and 2118. However, in order to decode sub-blocks of the blocks 2114, 2116, and 2118, the horizontal decoding order of the blocks 2114, 2116, and 2118 is determined to be the same as the horizontal decoding order applied to the block 2110 which is an upper block of the blocks 2114, 2116, and 2118. Therefore, the horizontal decoding order of the blocks 2114, 2116, and 2118 indicates the reverse direction.

In the embodiment of FIG. 21, the block 2114 and the block 2116 are not split. Thus, the block 2118 is decoded after the blocks 2114 and 2116 are decoded.

The block 2118 is split into two 16×16 blocks. Thus, it is determined whether the horizontal decoding order of blocks 2120 and 2122 is the forward or reverse direction.

A first size value of the block 2118 is 16. Because the first size value of the block 2118 is smaller than the minimum SUCO size, a horizontal decoding order applied to the blocks 2120 and 2122 is determined according to the horizontal decoding order of the block 2118. Therefore, the horizontal decoding order applied to the blocks 2120 and 2122 is determined as the reverse direction. Thus, the block 2122 is decoded before the block 2120.

The block 2122 is split into 16×8 blocks. Thus, it is determined whether a horizontal decoding order of blocks 2124 and 2126 is the forward or reverse direction.

A first size value of the block 2122 is 16. Therefore, because the first size value of block 2122 is smaller than the minimum SUCO size, a horizontal decoding order applied to blocks 2124 and 2126 is determined according to the horizontal decoding order of the block 2122. Therefore, the horizontal decoding order applied to the blocks 2124 and 2126 is determined as the reverse direction. Thus, the block 2126 is decoded before the block 2124.

In conclusion, the lower horizontal decoding order of the blocks 2118 and 2122, the first size values of which are smaller than the minimum SUCO size is determined according to the upper horizontal decoding order. The lower horizontal decoding order of the block 2110, the sub-blocks of which are adjacent to each other only in the vertical direction is determined according to the upper horizontal decoding order. The lower horizontal decoding order of the block 2100 and the block 2102, the first size values of which are greater than or equal to the minimum SUCO size and the sub-blocks of which are adjacent to each other in a left or right direction is determined according to the horizontal coding order information obtained from the bitstream.

The coding order determiner 1620 may check coding-order change permission information with respect to an upper data unit of the current block. The coding-order change permission information indicates whether a change of a coding order of blocks included in a higher data unit of a current block is permitted. When the coding-order change permission information does not permit a change of the coding order, all the blocks of the higher data unit are decoded according to a basic coding order. When the coding-order change permission information indicates that coding order information of the current block has been encoded, the coding order determiner 1620 may obtain the coding order information.

The coding-order change permission information may be included in a video parameter set, a sequence parameter set, a picture parameter set, a slice segment header, largest coding unit header, or the like. When there are two or more types of coding order information, pieces of coding-order change permission information for the two or more types of coding order information may be divided and stored in different headers.

The coding-order change permission information may indicate a depth or a block size for providing coding order information. For example, the coding order determiner 1620 may obtain the coding order information only when a depth of a current block is included in the depth indicated by the coding-order change permission information. As another example, the coding order determiner 1620 may obtain the coding order information only when the depth of the current block corresponds to the block size indicated by the coding-order change permission information.

When split information does not indicate splitting of the current block, the prediction method determiner 1630 may determine a prediction method of the current block, based on encoding information of the current block and whether neighboring blocks of the current block have been decoded.

The encoding information of the current block may indicate how to predict the current block. In detail, the encoding information may indicate a prediction method among a plurality of intra prediction modes and an inter prediction mode. Intra prediction modes applicable to the current block may include a directional mode, a DC mode, a planner mode, a multi-parameter intra-prediction (MPI) mode, a linear-model (LM) chroma mode, a most probable chroma (MPC) mode, and the like. Inter prediction modes applicable to the current block may include a merge mode, an advanced motion vector prediction (AMVP) mode, an inter skip mode, an overlapped block motion compensation (OBMC) mode, a sub-block motion vector prediction (MVP) mode, an affine motion compensation (MC) mode, a frame rate-up conversion (FRUC) mode, and the like. Accordingly, the prediction method determiner 1630 may determine a prediction mode to be applied to the current block according to the encoding information of the current block.

A reference block and a reference sample to be referenced for prediction of the current block may be determined according to whether neighboring blocks of the current block have been decoded. According to the raster scan described above with reference to FIGS. 17A to 17C, only left, upper, upper left, upper right and lower left blocks of the current block may be decoded before the current block. However, when a coding tree block to which the current block belongs is encoded by the coding order determiner 1620 according to a coding order different from the raster scan, a right block and a lower right block of the current block may also be decoded before the current block. Accordingly, the prediction method determiner 1630 may determine a reference block and a reference sample to be referenced for prediction of the current block according to whether the left, upper, upper left, upper right, lower left, right, and lower right blocks of the current block have been decoded.

When the current block is intra predicted, the prediction method determiner 1630 may determine reference samples to be referenced for the current block according to whether neighboring blocks of the current block have been decoded. In the intra prediction mode, prediction values of samples of the current block are determined by referring to sample values of samples neighboring to the current block. Therefore, only neighboring blocks, which are decoded before the current blocks and thus are referenceable for the current block, among the neighboring blocks of the current block may be used for prediction of the current block.

As a concrete example, when blocks are encoded in the forward direction of the raster scan described above with reference to FIGS. 17A to 17C, reference samples of the upper block, the left block, the upper left block, the lower left block, and the upper right block of the current block may be used for prediction of a current sample. In contrast, when blocks are encoded in the reverse direction of the raster scan, reference samples of the upper block, the right block, the upper right block, the lower right block, and the upper left block of the current block may be used for prediction of a current sample.

The decoder 1640 may predict the current block according to the prediction method determined by the prediction method determiner 1630, and decode the current block, based on a result of prediction of the current block.

When the split information does not indicate splitting of the current block, the decoder 1640 may obtain a last block flag indicating whether the current block is a last block of the coding tree block including the current block from the bitstream.

When the last block flag indicates that the current block is the last block of the coding tree block, the decoder 1640 may end decoding of the coding tree block after decoding the current block. After the decoding of the current block is completed, a next coding tree block may be decoded by the video decoding apparatus 1600. Similar to the coding tree block including the current block, block splitting, coding-order determination, and decoding of a lastly obtained block may be performed on the next coding tree block by the block splitter 1610, the coding order determiner 1620, and the prediction method determiner 1630 and the block decoder 1640 of the video decoding apparatus 1600.

Alternatively, the decoder 1640 may determine whether the current block is the last block of the coding tree block by determining whether the blocks of the coding tree block except the current block have been decoded without obtaining the last block flag.

The decoder 1640 may entropy decode a syntax element obtained from the bitstream according to context of neighboring blocks. For example, a skip flag indicating whether the current block is encoded according to a skip mode may be entropy encoded according to the context of neighboring blocks of the current block. Therefore, the skip flag may be entropy encoded in consideration of the context of whether the right block of the current block is decoded. Therefore, the syntax element entropy-encoded according to the context of the neighboring blocks of the current block may be entropy-encoded in consideration of whether the right block of the current block is decoded, similar to the skip flag.

The decoder 1640 may inversely quantize and inversely transform residual data obtained from the bitstream. In addition, the decoder 1640 may reconstruct the current block by using the inversely quantized and inversely transformed residual data and the prediction result of the current block.

Figure 22:
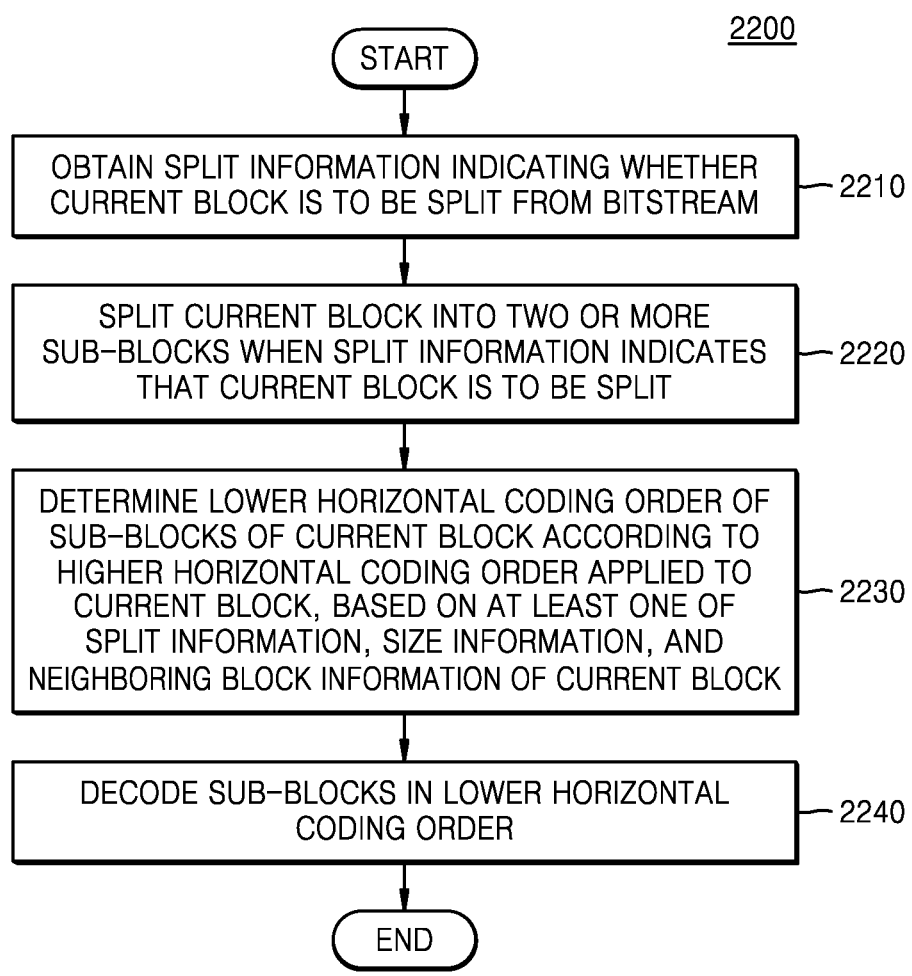
FIG. 22 illustrates a video decoding method related to splitting of a current block and determination of a coding order of sub-blocks split from the current block, according to an embodiment.

FIG. 22 illustrates a video decoding method 2200 related to splitting of a current block and determination of a coding order of sub-blocks split from the current block, according to an embodiment.

In operation 2210, split information indicating whether a current block is to be split is obtained from a bitstream.

In operation 2220, when the split information indicates splitting of the current block, the current block may be split into two or more sub-blocks.

In operation 2230, a lower horizontal coding order of the sub-blocks of the current block may be determined according to a higher horizontal coding order applied to the current block, based on at least one of split information, size information, and neighboring block information of the current block.

In an embodiment, when the split information of the current block indicates horizontal splitting of the current block, a lower horizontal coding order of the sub-blocks may be determined according to the upper horizontal coding order applied to the current block.

In an embodiment, when a first size value according to the size information of the current block is smaller than a minimum SUCO size, the lower horizontal coding order of the sub-blocks may be determined according to the higher horizontal coding order applied to the current block. Alternatively, when the first size value according to the size information of the current block is larger than the minimum SUCO size, the lower horizontal coding order of the sub-blocks may be determined according to the higher horizontal coding order applied to the current block. The first size value may be determined according to a smaller value among a height and a width value of the current block.

In an embodiment, when a second size value according to the size information of the current block is larger than a maximum SUCO size, the lower horizontal coding order of the sub-blocks may be determined according to the higher horizontal coding order applied to the current block. Alternatively, when the second size value according to the size information of the current block is smaller than the maximum SUCO size, the lower horizontal coding order of the sub-blocks may be determined according to the higher horizontal coding order applied to the current block. The second size value may be determined according to a larger value among the height and the width of the current block.

Minimum SUCO size information indicating the minimum SUCO size and maximum SUCO size information indicating the maximum SUCO size may be obtained from the bitstream with respect to the data unit of the current block.

In an embodiment, the lower horizontal coding order of the sub-blocks may be determined according to a position of a neighboring block decoded before the current block, the neighboring block being indicated by the neighboring block information of the current block.

In an embodiment, when there is no higher horizontal coding order indicating a coding order applied to the current block, coding order information indicating the lower horizontal coding order may be obtained from the bitstream.

In operation 2240, the sub-blocks may be decoded in the lower horizontal coding order.

The function of the video decoding apparatus 1600 described above with reference to FIG. 16 may be included in the video decoding method 2200.

Figure 23:
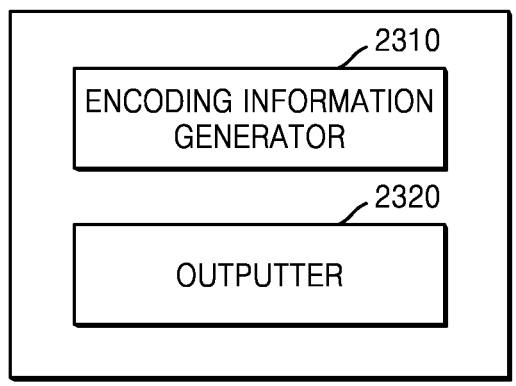
FIG. 23 illustrates a video encoding apparatus related to splitting of a current block and determination of a coding order of sub-blocks split from the current block, according to an embodiment.

FIG. 23 illustrates a video encoding apparatus 2300 related to splitting of a current block and determination of a coding order of sub-blocks split from the current block, according to an embodiment.

The video encoding apparatus 2300 includes an encoding information generator 2310 and an outputter 2320. Although FIG. 23 illustrates that the encoding information generator 2310 and the outputter 2320 as separate components, the encoding information generator 2310 and the outputter 2320 may be combined into the same component in an embodiment.

Although FIG. 23 illustrates the encoding information generator 2310 and the outputter 2320 as components included in one apparatus, devices performing the functions of the encoding information generator 2310 and the outputter 2320 are not necessarily physically located adjacent to each other. Therefore, in an embodiment, the encoding information generator 2310 and the outputter 2320 may be dispersed.

In an embodiment, the encoding information generator 2310 and the outputter 2320 may be implemented by one processor. In an embodiment, the encoding information generator 2310 and the outputter 2320 may be implemented by a plurality of processors.

The functions of the encoding information generator 2310 and the outputter 2320 of FIG. 23 may be performed by the outputter 130 of FIG. 1A.

The encoding information generator 2310 may determine whether a current block is split and a split type. In addition, split information of the current block may be generated, based on whether the current block is split and the split type.

When the current block is split, the encoding information generator 2310 may determine a lower horizontal coding order of two or more sub-blocks included in the current block according to a horizontal coding order applied to the current block, based on at least one of split information, size information, and neighboring block information of the current block. When conditions according to the split information, the size information, and the neighboring block information are not satisfied, the encoding information generator 2310 may determine a lower horizontal coding order of the current block and generate coding order information representing the lower horizontal coding order of the current block.

On the contrary, when the conditions according to the split information, the size information, and the neighboring block information are satisfied, the encoding information generator 2310 may determine a lower horizontal coding order of the current block from an upper horizontal coding order of the current block and does not generate horizontal coding order information to be included in a bitstream.

Thereafter, the encoding information generator 2310 may encode the sub-blocks according to the lower horizontal coding order.

The outputter 2320 outputs a bitstream including the split information and the horizontal coding order information of the current block which are generated by the encoding information generator 2310. When coding order information of the current block is not generated, the outputter 2320 may output a bitstream including only the split information of the current block.

The video encoding apparatus 200 of FIG. 23 may perform a video encoding method corresponding to the video decoding method performed by the video decoding apparatus 1600 of FIG. 16.

Figure 24:
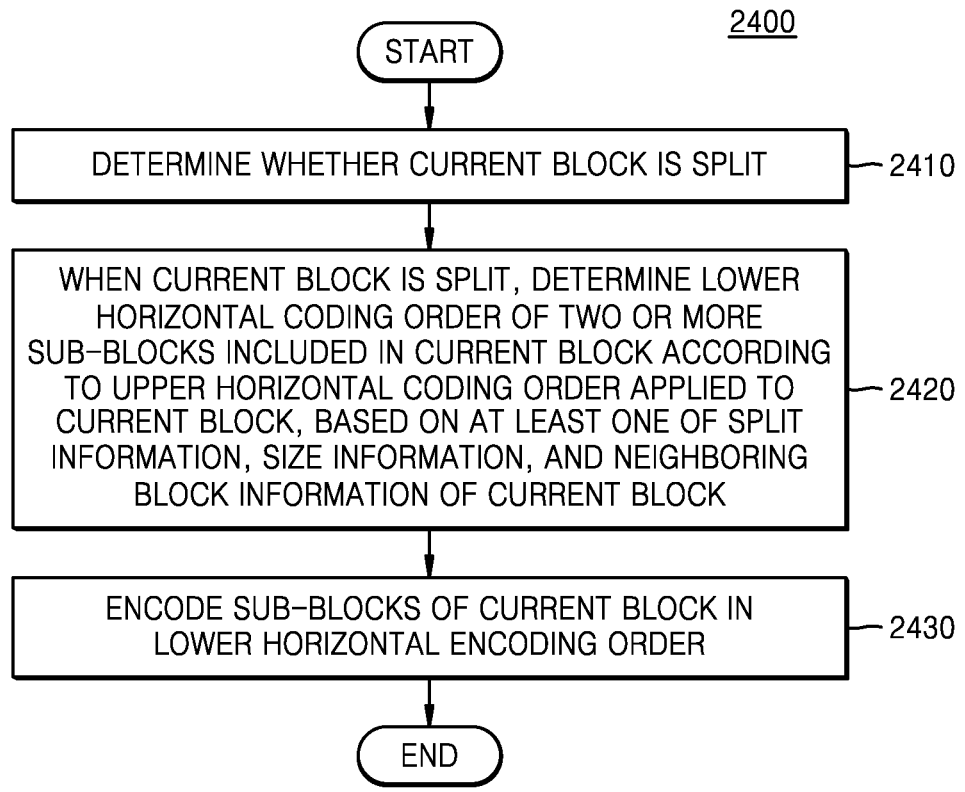
FIG. 24 illustrates a video encoding method related to splitting of a current block and determination of a coding order of sub-blocks split from the current block, according to an embodiment.

FIG. 24 illustrates a video decoding method 2400 related to splitting of a current block and determination of a coding order of sub-blocks split from the current block, according to an embodiment.

In operation 2410, it is determined whether a current block is split.

In operation 2420, when the current block is split, a lower horizontal coding order of two or more sub-blocks included in the current block is determined according to an upper horizontal coding order applied to the current block, based on at least one of split information, size information, and neighboring block information of the current block.

In operation 2430, the sub-blocks of the current block are encoded in the lower horizontal encoding order.

The function of the video encoding apparatus 2400 described above with reference to FIG. 24 may be included in the video encoding method 2300.

Spatial-domain image data may be encoded for each of coding units of a tree structure by a video encoding technique based on the coding units of the tree structure and be reconstructed by decoding each of largest coding units by a video decoding technique based on coding units of a tree structure as described above with reference to FIGS. 1 to 24, such that a picture and a video which is a picture sequence may be reconstructed. The reconstructed video may be reproduced by a reproducing device, stored in a storage medium, or transmitted via a network.

The above-described embodiments of the present disclosure may be embodied as a computer executable program and implemented via a computer-readable recording medium by a general-purpose digital computer for execution of the program.

While the present disclosure has been described above in connection with specific best embodiments, other disclosures derivable by making alternatives, modifications, and changes in the disclosure will be apparent to those of ordinary skill in the art, in view of the foregoing description. In other words, the appended claims should be understood to cover all such alternatives, modifications and changes. Therefore, all the matters described in the present specification and illustrated in the drawings should be interpreted in an illustrative and non-limiting sense.

The invention claimed is:

1. A video decoding method comprising:
obtaining split information indicating whether a current block is to be split into lower blocks from a bitstream;
when a smaller value among a height and a width of the current block is smaller than a minimum split unit coding order (SUCO) size or a larger value among the height and the width of the current block is greater than a maximum SUCO size, determining lower horizontal coding order information applied to the lower blocks to be identical to higher horizontal coding order information from the bitstream,
splitting the current block into the lower blocks when the split information indicates that the current block is to be split; and
decoding the lower blocks according to a coding order indicated by the lower horizontal coding order information.

2. The video decoding method of claim 1, further comprising
obtaining maximum SUCO size information representing the maximum SUCO size with respect to an upper data unit of the current block from the bitstream.

3. A video decoding apparatus comprising a processor configured to:
obtain split information indicating whether a current block is to be split into lower blocks from a bitstream;
when a smaller value among a height and a width of the current block is smaller than a minimum split unit coding order (SUCO) size or a larger value among the height and the width of the current block is greater than a maximum SUCO size, determine lower horizontal coding order information applied to the lower blocks to be identified to higher horizontal coding order information applied to the current block, without obtaining the lower horizontal coding order information from the bitstream;
split the current block into the lower blocks when the split information indicates that the current block is to be split; and
decode the lower blocks according to a coding order indicated by the lower horizontal coding order information.

4. A video encoding method comprising:
determining whether a current block is split into lower blocks;
when the current block is split into the lower blocks and when a smaller value among a height and a width of the current block is smaller than a minimum split unit coding order (SUCO) size or a larger value among the height and the width of the current block is greater than a maximum SUCO size, determining lower horizontal coding order information applied to the lower blocks to be identical to higher horizontal coding order information applied to the current block, without encoding the lower horizontal coding order information into the bitstream; and
encoding the lower blocks according to a coding order indicated by the lower horizontal coding order information.

5. A non-transitory computer-readable recording medium storing a program for performing the video decoding method of any one of claim 1 and 2.

6. A non-transitory computer-readable recording medium storing a program for performing the video encoding method of claim 4.

* * * * *